United States Patent
Kim et al.

(10) Patent No.: US 11,508,187 B2
(45) Date of Patent: Nov. 22, 2022

(54) PUPIL DETECTION DEVICE

(71) Applicants: Samsung Display Co., Ltd., Yongin-si (KR); Inha University Research and Business Foundation, Incheon (KR)

(72) Inventors: Young Chan Kim, Incheon (KR); Min Gyeong Jo, Suwon-si (KR); Byung Cheol Song, Seoul (KR); Kang Il Lee, Incheon (KR); Jun Ho Choi, Bucheon-si (KR)

(73) Assignees: Samsung Display Co., Ltd., Yongin-si (KR); Inha University Research and Business Foundation, Incheon (KR)

( * ) Notice: Subject to any disclaimer, the term of this patent is extended or adjusted under 35 U.S.C. 154(b) by 0 days.

(21) Appl. No.: 17/028,953

(22) Filed: Sep. 22, 2020

(65) Prior Publication Data
US 2021/0117672 A1  Apr. 22, 2021

(30) Foreign Application Priority Data
Oct. 16, 2019  (KR) .................. 10-2019-0128157

(51) Int. Cl.
*G06K 9/00* (2022.01)
*G06V 40/19* (2022.01)
(Continued)

(52) U.S. Cl.
CPC .......... *G06V 40/19* (2022.01); *G06K 9/6232* (2013.01); *G06K 9/6262* (2013.01); *G06V 10/30* (2022.01); *G06V 40/193* (2022.01)

(58) Field of Classification Search
CPC .... G06K 9/00604; G06K 9/40; G06K 9/6262; G06K 9/6232; G06K 9/0061;
(Continued)

(56) References Cited

U.S. PATENT DOCUMENTS

| 2013/0077884 A1* | 3/2013 | Ikai ........................ H04N 19/86 382/233 |
| 2017/0249509 A1 | 8/2017 | Blixt et al. |

(Continued)

FOREIGN PATENT DOCUMENTS

| KR | 10-2012-0049605 A | 5/2012 |
| KR | 10-1501410 B1 | 3/2015 |
| KR | 10-2018-0009303 A | 1/2018 |

OTHER PUBLICATIONS

Wolfgang Fulh," PupilNet: Convolution neural network for robust pupil detection" (Year: 2016).*

*Primary Examiner* — Dhaval V Patel
(74) *Attorney, Agent, or Firm* — Lewis Roca Rothgerber Christie LLP

(57) ABSTRACT

A pupil detection device includes: a filter weight learner configured to generate a target image on the basis of pupil coordinate data acquired from a learning image and learn weights of a plurality of filters in order to generate a filtered image, by filtering the learning image using the plurality of filters, that is within a predetermined reference range of the target image; a split image generator configured to generate a pupil region split image for an input image using the plurality of filters having the learned weights; and a pupil coordinate detector configured to remove noise of the pupil region split image, select at least one of a plurality of pixels from which noise is removed, and detect pupil coordinates.

19 Claims, 16 Drawing Sheets

(51) Int. Cl.
*G06K 9/62* (2022.01)
*G06V 10/30* (2022.01)
*G06V 40/18* (2022.01)

(58) Field of Classification Search
CPC .. G06K 9/6272; G06K 9/00597; G06T 5/002; G06T 7/11; G06T 5/20; G06N 3/08
See application file for complete search history.

(56) References Cited

U.S. PATENT DOCUMENTS

| | | |
|---|---|---|
| 2017/0302901 A1* | 10/2017 | Yang .................... G06T 7/20 |
| 2019/0357759 A1* | 11/2019 | Yamamoto .......... A61B 1/0638 |
| 2021/0004572 A1* | 1/2021 | Hu ..................... G06F 3/011 |
| 2021/0074036 A1* | 3/2021 | Fuchs .................. G06T 9/002 |
| 2021/0232848 A1* | 7/2021 | Wang .................. G06N 3/04 |

* cited by examiner

PUPIL DETECTION DEVICE

CROSS-REFERENCE TO RELATED APPLICATION

This application claims priority to and the benefit of Korean Patent Application No. 10-2019-0128157, filed on Oct. 16, 2019, in the Korean Intellectual Property Office, the disclosure of which is incorporated herein by reference in its entirety.

BACKGROUND

1. Field

Aspects of some example embodiments of the present disclosure relate to a pupil detection device for detecting pupils in an input image.

2. Description of the Related Art

Various techniques such as gaze tracking, iris recognition, and pupil detection may be utilized to determine where users of various electronic devices are gazing.

For example, a display device may be adaptively operated according to the characteristics and activity of a user based on gaze information of the user by utilizing a pupil detection technique. Also, a pupil detection device may be used to analyze and identify eye movement patterns as part of clinical trials when research is conducted on mental disorders such as autism and dementia under medical circumstances. Also, a pupil detection device may also be utilized by various electronic devices for interacting with a user, for example, an intelligent robot.

The above information disclosed in this Background section is only for enhancement of understanding of the background and therefore the information discussed in this Background section does not necessarily constitute prior art.

SUMMARY

Aspects of some example embodiments according to the present disclosure include a pupil detection device capable of improving detection performance by removing false detections for various input images.

It should be noted that characteristics of embodiments according to the present invention are not limited to the above-described characteristics, and other characteristics of embodiments according to the present invention will be apparent to those skilled in the art from the following descriptions.

According to some example embodiments of the present invention, a pupil detection device includes: a filter weight learning unit configured to generate a target image on the basis of pupil coordinate data acquired from a learning image and learn weights of a plurality of filters in order to make a filtered image obtained by filtering the learning image using the plurality of filters similar to the target image to a predetermined reference, a split image generation unit configured to generate a pupil region split image for an input image using the plurality of filters having the learned weights, and a pupil coordinate detection unit configured to remove noise of the pupil region split image, select at least one of a plurality of pixels from which noise is removed, and detect pupil coordinates.

According to some example embodiments, the plurality of filters may comprise a convolution filter configured to perform weighted convolution filtering and output a feature map, a max-pooling filter configured to select a main value from an input feature map and perform max-pooling filtering, and an up-sampling filter configured to perform up-sampling filtering on the input feature map.

According to some example embodiments, the plurality of filters may comprise an encoder composed of at least one max-pooling filter, which is identical to the max-pooling filter.

According to some example embodiments, the plurality of filters may comprise a decoder composed of at least one up-sampling filter, which is identical to the up-sampling filter, and at least one convolution filter, which is identical to the convolution filter.

According to some example embodiments, the filter weight learning unit may comprise a skip connecting network for connecting a feature map input to the encoder to a feature map obtained by performing up-sampling filtering on an output of the encoder.

According to some example embodiments, the plurality of filters may further comprise an auxiliary filter composed of at least one max-pooling filter, which is identical to the max-pooling filter, and at least one up-sampling filter, which is identical to the up-sampling filter.

According to some example embodiments, the filter weight learning unit may merge a feature map obtained by performing convolution filtering on the learning image with a feature map obtained by additionally performing max-pooling filtering and up-sampling filtering on the feature map obtained by performing convolution filtering and the filter weight learning unit may perform convolution filtering on the merged feature map.

According to some example embodiments, when the number of weight learning times of the plurality of filters does not reach a predetermined number, the filter weight learning unit may change the weights of the plurality of filters and then may repeat a filtering process using the plurality of filters.

According to some example embodiments, the filter weight learning unit may change the weights of the plurality of filters on the basis of a result of comparing the filtered image to the target image.

According to some example embodiments, when a result of comparing the filtered image to the target image does not satisfy the predetermined reference, the filter weight learning unit may change the weights of the plurality of filters and then may repeat the filtering process using the plurality of filters.

According to some example embodiments, the filter weight learning unit may sequentially perform convolution filtering and max-pooling filtering on the learning image, may additionally perform up-sampling filtering and convolution filtering on the feature map on which max-pooling filtering has been performed to generate a main filtered image, and may additionally perform max-pooling filtering, up-sampling filtering, and convolution filtering on the feature map on which max-pooling filtering has been performed to generate an auxiliary filtered image.

According to some example embodiments, when the number of weight learning times of the plurality of filters does not reach a predetermined number, the filter weight learning unit may change the weights of the plurality of filters and then may repeat the filtering process using the plurality of filters.

According to some example embodiments, the filter weight learning unit may change the weights of the plurality of filters on the basis of a loss function calculated based on the target image, the main filtered image, the learning image, and the auxiliary filtered image.

According to some example embodiments, when a loss function calculated based on the target image, the main filtered image, the learning image, and the auxiliary filtered image exceeds a predetermined value, the filter weight learning unit may change the weights of the plurality of filters and then may repeat the filtering process using the plurality of filters.

According to some example embodiments, the filter weight learning unit may merge a feature map obtained by performing convolution filtering on the learning image and then input to the encoder with a feature map obtained by performing up-sampling filtering on an output of the encoder, may perform convolution filtering on the merged feature map to generate a main filtered image, and may perform filtering on the output of the encoder using the auxiliary filter to generate an auxiliary filtered image.

According to some example embodiments, when the number of weight learning times of the plurality of filters does not reach a predetermined number, the filter weight learning unit may change the weights of the plurality of filters and then may repeat the filtering process using the plurality of filters.

According to some example embodiments, the filter weight learning unit may change the weights of the plurality of filters on the basis of a loss function calculated based on the target image, the main filtered image, the learning image, and the auxiliary filtered image.

According to some example embodiments, when a loss function calculated based on the target image, the main filtered image, the learning image, and the auxiliary filtered image exceeds a predetermined value, the filter weight learning unit may change the weights of the plurality of filters and then may repeat the filtering process using the plurality of filters.

According to some example embodiments, the filter weight learning unit may perform labeling on the learning image to acquire pupil coordinate data, may expand the pupil coordinate data, and may perform Gaussian filtering to generate the target image.

According to some example embodiments, the pupil coordinate detection unit may remove noise of the pupil region split image and may perform indexing on the pupil region split image from which the noise is removed to detect pupil coordinates.

BRIEF DESCRIPTION OF THE DRAWINGS

The above and other aspects and characteristics of embodiments according to the present disclosure will become more apparent by describing in more detail aspects of some example embodiments thereof with reference to the attached drawings, in which.

DETAILED DESCRIPTION

Figure 1:
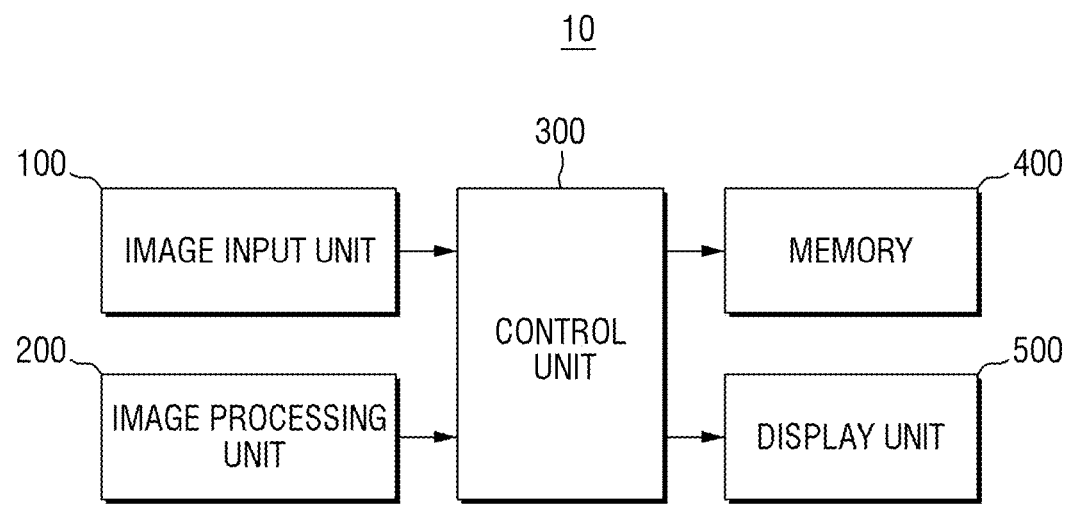
FIG. 1 is a block diagram showing a pupil detection device according to some example embodiments.

In the following description, for the purposes of explanation, numerous specific details are set forth in order to provide a more thorough understanding of various example embodiments or implementations of the invention. As used herein "embodiments" and "implementations" are interchangeable words that are non-limiting examples of devices or methods employing one or more of the inventive concepts disclosed herein. It is apparent, however, that various example embodiments may be practiced without these specific details or with one or more equivalent arrangements. In other instances, certain structures and devices that do not require a detailed explanation to enable a person having ordinary skill in the art to make and use the invention are shown in block diagram form in order to avoid unnecessarily obscuring various characteristics of example embodiments. Further, various example embodiments may be different, but do not have to be exclusive. For example, specific shapes, configurations, and characteristics of an example embodiment may be used or implemented in another example embodiment without departing from the spirit and scope of embodiments according to the present disclosure.

Unless otherwise specified, the illustrated example embodiments are to be understood as providing example features of varying detail of some ways in which embodiments according to the present disclosure may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an example embodiment may be implemented differently, a specific process order may be performed differently from the described order. For example, two consecutively described processes may be performed substantially at the same time or performed in an order opposite to the described order. Also, like reference numerals denote like elements.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various example embodiments are described herein with reference to sectional and/or exploded illustrations that are schematic illustrations of idealized example embodiments and/or intermediate structures. As such, variations from the shapes of the illustrations as a result, for example, of manufacturing techniques and/or tolerances, are to be expected. Thus, example embodiments disclosed herein should not necessarily be construed as being limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some example embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies.

In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some example embodiments may be physically separated into two or more interacting and discrete blocks, units, and/or modules without departing from the scope of the inventive concepts. Further, the blocks, units, and/or modules of some example embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a block diagram showing a pupil detection device according to some example embodiments.

Referring to FIG. 1, a pupil detection device 10 may receive a face image of a user, detect an eye region, and detect a pupil in the eye region. For example, a face image may correspond to an image of all or part of a face including a user's eyes.

The pupil detection device 10 may have a camera for capturing a face image, an infrared pass filter, and a visible light cut-off filter. For example, the camera may include a high-magnification lens to zoom in and photograph a portion around the user's eyes.

The pupil detection device 10 may include an image input unit (or image input component, or image input device) 100, an image processing unit (or image processor) 200, a control unit (or a controller) 300, a memory 400, and a display unit (or display) 500.

The image input unit 100 may be installed or mounted on one surface of the pupil detection device 10 and may be configured to receive or capture an image of a user's face. The image input unit 100 may include, for example, a camera having a lens, an image sensor, a flash, etc. The image input unit 100 may capture a still (or static) image or a video and may provide a captured image signal to the image processing unit 200. For example, the image signal may be output from an image sensor including a plurality of pixels arranged in an m×n matrix (here, m and n are natural numbers) and may be include a set of voltages (e.g., pixel values) corresponding to the plurality of pixels.

The image processing unit 200 may detect an eye region from an input image. An image captured using a camera may include brightness information, and the image processing unit 200 may detect the eye region on the basis of the brightness information. For example, because reflected light in a corneal region has a brighter pixel value than reflected light in a corneal periphery region, the image processing unit 200 may select or identify a region having a relatively bright pixel value as an eye region. As another example, because a difference in pixel value between reflected light in a corneal region and reflected light in a corneal periphery region is relatively large, the image processing unit 200 may select a region having a relatively large difference in the pixel value of reflected light as an eye region.

The image processing unit 200 may process an image signal provided from the image input unit 100 to detect a pupil. The pupil detection of the image processing unit 200 may be applied to still images and videos, respectively. For example, the image processing unit 200 may perform pupil detection learning through a plurality of images and may detect pupil coordinates from an input image by using accumulated pupil detection data.

The control unit 300, which may be, for example, a central processing unit, may control the overall operation of the pupil detection device 10 and may control functions of the pupil detection device 10 according to a result of detecting a user's pupil. For example, the control unit 300 may receive various user inputs through the image input unit 100 as well as the touch screen-type display unit 500. Here, the user inputs may include a variety of information input to the pupil detection device 10 such as a user's touch, gesture, pupil movement, and the like. The control unit 300 may perform one or more functions (e.g., one or more set or predetermined functions) of the pupil detection device 10 corresponding to or based on a user input.

The memory 400 may store an operating system of the pupil detection device 10, a plurality of applications, data input to the pupil detection device 10, and the like. The memory 400 may store photographs and videos and may also store a pupil detection algorithm, data, and so on for pupil detection which are input through the image input unit 100. For example, the memory 400 may store information used for eye region detection, filter information used for pupil detection, and pupil detection algorithm information used for pupil detection. The information stored in the memory 400 may be updated through repeated pupil detection learning.

The display unit 500 may display an image on the basis of the image signal input from the control unit 300. For example, the display unit 500 may be a display device such as a liquid crystal display device, a field emission display device, and an organic light-emitting display device.

The display unit 500 may be implemented as a touch screen including a touch panel. When the surface of the display unit 500 is touched by a user input means (e.g., a user's finger, a stylus, etc.), the display unit 500 may provide information regarding a touch position or a touch pressure to the control unit 300. For example, a user may touch an icon displayed on a screen of the display unit 500, and the pupil detection device 10 may execute an application corresponding to the touched icon.

Figure 2:
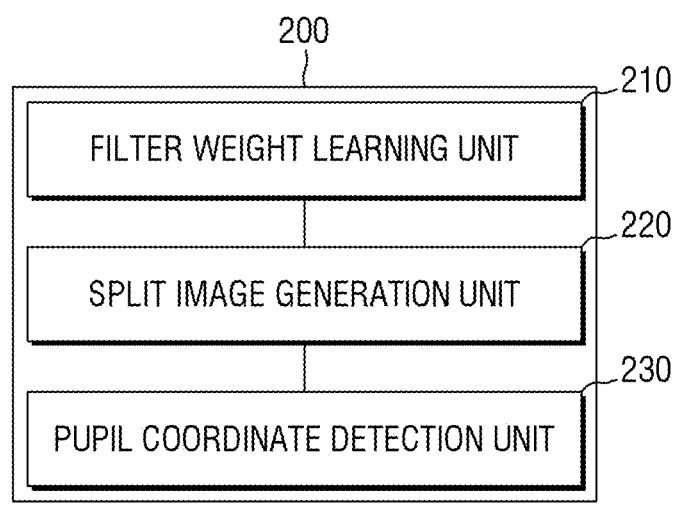
FIG. 2 is a block diagram showing an image processing unit of the pupil detection device according to some example embodiments.
Figure 3:
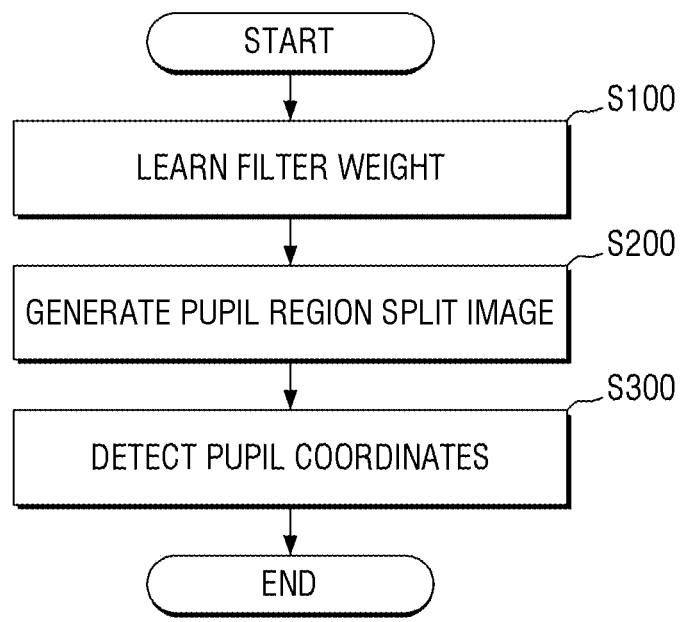
FIG. 3 is a flowchart illustrating a pupil detecting process of the pupil detection device according to some example embodiments.

FIG. 2 is a block diagram showing an image processing unit of the pupil detection device according to some example embodiments, and FIG. 3 is a flowchart illustrating a pupil detecting process of the pupil detection device according to some example embodiments.

Referring to FIGS. 2 and 3, the image processing unit 200 may include a filter weight learning unit (or filter weight learner or filter weight learning component, or filter weight learning circuit) 210, a split image generation unit (or split image generator, or split image generation component, or split image generation circuit) 220, and a pupil coordinate detection unit (or pupil coordinate detector, or pupil coordinate detection component, or pupil coordinate detection circuit) 230.

The filter weight learning unit 210 may learn the weights of a plurality of filters (operation S100 in FIG. 3). The filter weight learning unit 210 may receive a learning image and generate a target image on the basis of pupil coordinate data acquired from the learning image. For example, the filter weight learning unit 210 may label the learning image to acquire the pupil coordinate data and may expand the pupil coordinate data and perform Gaussian filtering to generate the target image.

The filter weight learning unit 210 may filter the learning image using the plurality of filters. The filter weight learning unit 210 may learn the weights of the plurality of filters in order to make a filtered image obtained by filtering the learning image similar to the target image. For example, the filter weight learning unit 210 may learn the weights of the plurality of filters by repeating a filtering process a number of times (e.g., a set or predetermined number of times). As another example, the filter weight learning unit 210 may learn the weights of the plurality of filters by repeating the filtering process until the filtered image becomes identical or similar to the target image to satisfy a reference (e.g., a set or predetermined reference) (e.g., such that the filtered image (e.g., pixel values or grayscale values of pixels) is within a set or predetermined reference range of the target image). When the weight learning is complete, the filter weight learning unit 210 may store the weights of the plurality of filters.

The split image generation unit (or split image generator or split image generation component or split image generation circuit) 220 may generate a pupil region split image for an input image using the plurality of filters having the learned weights (operation S200 in FIG. 3). The split image generation unit 220 may receive an image captured through the image input unit 100. The split image generation unit 220 may generate a pupil region split image including pupil coordinate information on the basis of an image input from the image input unit 100.

The split image generation unit 220 may separate objects included in the input image so as to generate the pupil region split image including the pupil coordinate information. The split image generation unit 220 may perform a binarization process to separate or distinguish a pupil region from a pupil periphery region. For example, each of a plurality of pixels located in the pupil region may have a pixel value including the pupil coordinate information. Some of the pixels located in the pupil region may have a maximal pixel value (e.g., a pixel value of 255). The maximum pixel value may correspond to the maximum value among the pixel values in the form of probability distributions. A plurality of pixels located in the pupil periphery region other than the pupil region may have a minimal pixel value (e.g., a pixel value of 0). Accordingly, the split image generation unit 220 may generate the pupil region split image including the pupil coordinate information by separating information other than the pupil coordinate information from the input image.

The pupil coordinate detection unit 230 may receive the pupil region split image and detect pupil coordinates (operation S300 in FIG. 3). The pupil coordinate detection unit 230 may remove noise from the pupil region split image, select at least one of a plurality of pixels from which the noise is removed, and then detect the pupil coordinates. For example, the pupil coordinate detection unit 230 may remove noise from the pupil region split image and perform indexing on the pupil region split image from which the noise is removed. Accordingly, the pupil coordinate detection unit 230 may detect pupil coordinates by indexing a pixel having the maximum pixel value in the pupil region split image from which the noise is removed.

Figure 4:
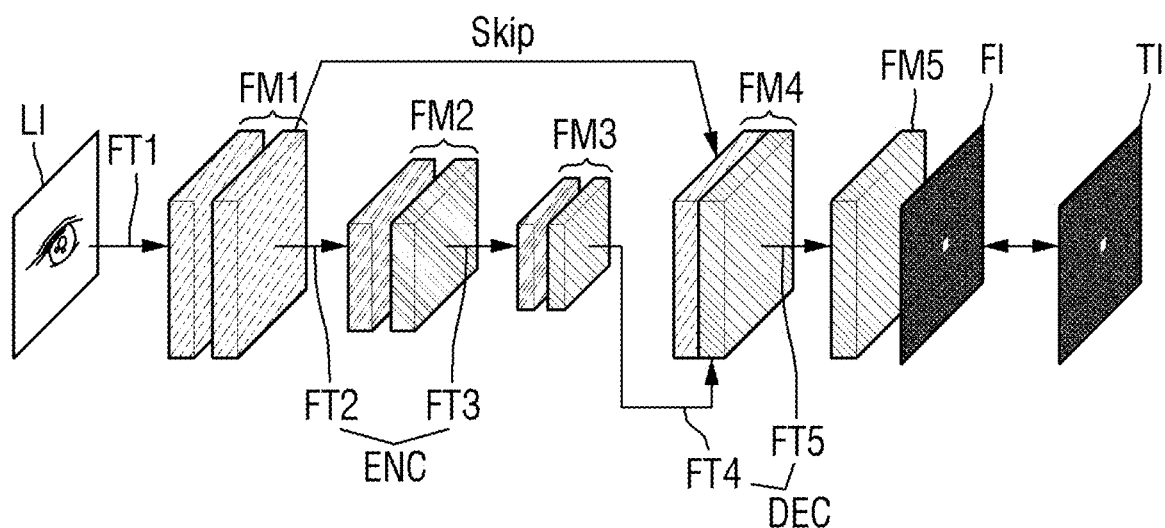
FIG. 4 is a diagram showing a plurality of filters of a filter weight learning unit according to some example embodiments.
Figure 5:
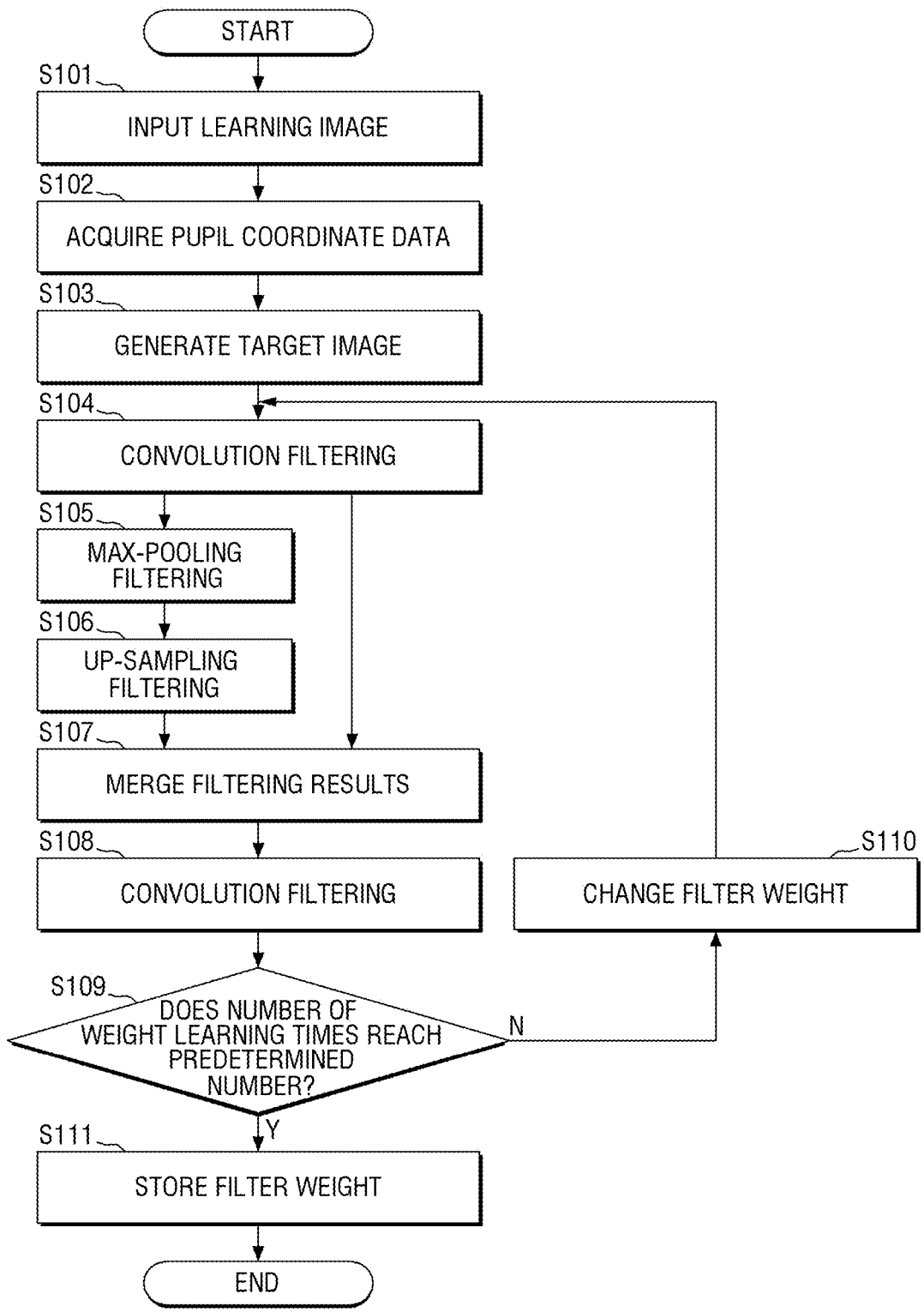
FIG. 5 is an example diagram illustrating a weight learning process of the filter weight learning unit of FIG. 4.

FIG. 4 is a diagram showing a plurality of filters of a filter weight learning unit according to some example embodiments, and FIG. 5 is an example diagram illustrating a weight learning process of the filter weight learning unit of FIG. 4.

Referring to FIGS. 4 and 5, the filter weight learning unit 210 may generate a target image TI on the basis of the pupil coordinate data acquired from a learning image LI and may generate a filtered image FI by filtering the learning image LI by means of a plurality of filters FT1 to FT5. The filter weight learning unit 210 may learn the weights of the plurality of filters FT1 to FT5 in order to make the filtered image FI similar to the target image TI to a reference (e.g., a set or predetermined reference).

The filter weight learning unit 210 may receive a learning image LI (operation S101 in FIG. 5). Here, the learning image LI may include various images including meaningful information related to a pupil (for example, spatial information of a pupil) or positional information of a pupil. The filter weight learning unit 210 may improve the accuracy of the learning of the weights of the plurality of filters FT1 to FT5. By the learning image LI including various images, the pupil detection device 10 may improve performance of detecting pupil coordinates from various input images.

The filter weight learning unit 210 may acquire pupil coordinate data from the learning image LI (operation S102 in FIG. 5). Here, the pupil coordinate data may correspond to coordinate data of a pixel matching with a pupil center among a plurality of pixels in a pupil region. The filter weight learning unit 210 may label the learning image LI to acquire the pupil coordinate data. For example, the learning image LI may be labeled by a user who selects or designates the pupil center from the learning image LI. The user may directly set the pupil coordinates to be detected from the learning image LI by performing the labeling. Accordingly, the pupil coordinate data may correspond to coordinate data of a pixel matching with the pupil center which is selected or designated by the user.

The filter weight learning unit 210 may generate a target image TI on the basis of the pupil coordinate data acquired from the learning image LI (operation S103 in FIG. 5). The filter weight learning unit 210 may expand the pupil coordinate data to a certain range from the pupil center. For example, a pixel value within an expanded range may be equal to the pixel value of the pupil center. Accordingly, a pixel within the expanded range in the pupil region may have the maximum pixel value (e.g., a pixel value of 255).

The filter weight learning unit 210 may perform Gaussian filtering on the expanded pupil coordinate data to generate the target image TI. For example, the target image TI may have the maximum pixel value (e.g., a pixel value of 255) at the pupil center through the Gaussian filtering, and the pixel value may decrease in a direction away from the pupil center. The target image TI may include meaningful information related to the pupil (e.g., spatial information of the pupil) on the basis of the maximum pixel value and the distribution area of the expanded pupil coordinate data.

The plurality of filters FT1 to FT5 may include first to fifth filters FT1 to FT5, and each of the first to fifth filters FT1 to FT5 may be implemented as one of a convolution filter, a max-pooling filter, and an up-sampling filter. For example, the pupil detection device 10 may implement a convolutional neural network by including a plurality of filters including at least one convolution filter, at least one max-pooling filter, and at least one up-sampling filter. By the plurality of filters implemented in the convolutional neural network, it may be possible to implement complex non-linear models and improve image processing performance or speech processing performance. For example, the plurality of filters may output the meaningful information related to the pupil and the positional information of the pupil by maintaining two-dimensional (2D) or three-dimensional (3D) data included in the input image as it is.

The following description describes aspects of example embodiments in which the first and fifth filters FT1 and FT5 are implemented as convolution filters, the second and third filters FT2 and FT3 are implemented as max-pooling filters, and the fourth filter FT4 is implemented as an up-sampling filter. However, the configuration of the plurality of filters according to example embodiments is not limited to the above.

By being implemented as convolution filters, the first and fifth filters FT1 and FT5 may perform weighted convolution filtering on an input image or an input feature map to output a feature map. Here, the output feature map may correspond to image data indicating various features of the input image or the input feature map. For example, the first and fifth filters FT1 and FT5 may change the current pixel value by multiplying each of the plurality of pixels of the input image data by a weight and then adding the multiplication results. For example, the image data having the structure of an m×n matrix (here, m and n are natural numbers) may be filtered by the weight of a filter having the structure of a p×q matrix (here, q is a natural number less than or equal to m, and q is a natural number less than or equal to n). The first and fifth filters FT1 and FT5 may each perform a dot product between the filter weight and the image data by sliding the filter weight on the image data. The first and fifth filters FT1 and FT5 may each perform a dot product while moving the filter weight on the image data at every interval determined by stride. Accordingly, the first and fifth filters FT1 and FT5 may output a feature map having a specific pattern for a specific position of the input feature map or the input image. The specific pattern included in the feature map may be used as the meaningful information related to the pupil or the positional information of the pupil.

By being implemented as max-pooling filters, the second and third filters FT2 and FT3 may each extract a main pixel value from the input feature map to output a small feature map. For example, the second and third filters FT2 and FT3 may each decrease the size of the feature map by extracting the maximum pixel value from each of a plurality of partial regions of the input feature map and removing the remaining pixel values. Accordingly, the second and third filters FT2 and FT3 may prevent local minor changes in pixel values of the feature map from affecting output data.

By being implemented as an up-sampling filter, the fourth filter FT4 may perform up-sampling on the max-pooling results of the second and third filters FT2 and FT3. The fourth filter FT4 may increase the size of the feature map, which has been decreased by the second and third filters FT2 and FT3, to a size corresponding to the input image. The configuration of the fourth filter FT4 may correspond to the configuration of the second and third filters FT2 and FT3, but the present invention is not limited thereto. For example, the fourth filter FT4 may restore the feature map by remembering the position of the pixel value before passing through the second filter FT2. The pixel values that have been removed by the second and third filters FT2 and FT3 may not be recovered again by the fourth filter FT4. As another example, the fourth filter FT4 may perform up-sampling through deconvolution.

The filter weight learning unit 210 may perform convolution filtering on the learning image LI using the first filter FT1 (S104). For example, the first filter FT1 may output a first feature map FM1 obtained by multiplying each of the plurality of pixels of the learning image LI by a weight and then adding the multiplication results. The first filter FT1 may perform a dot product between the filter weight and the image data by sliding the filter weight on the learning image LI.

The filter weight learning unit 210 may perform max-pooling filtering on the first feature map FM1 using an encoder ENC (S105). The encoder ENC may include the second and third filters FT2 and FT3.

The filter weight learning unit 210 may perform max-pooling filtering on the first feature map FM1 using the second filter FT2. The second filter FT2 may extract a main pixel value from the first feature map FM1 and output a second feature map FM2 having a small size. For example, the second filter FT2 may decrease the size of the second feature map FM2 by extracting the maximum pixel value from each of a plurality of partial regions of the first feature map FM1 and removing the remaining pixel values.

The filter weight learning unit 210 may perform max-pooling filtering on the second feature map FM2 using the third filter FT3. The third filter FT3 may extract a main pixel value from the second feature map FM2 and output a third feature map FM3 having a small size. For example, the third filter FT3 may decrease the size of the third feature map FM3 by extracting the maximum pixel value from each of a plurality of partial regions of the second feature map FM2 and removing the remaining pixel values.

The filter weight learning unit 210 may perform deconvolution filtering on the feature map filtered by the encoder ENC using a decoder DEC. For example, the decoder DEC may have a weight corresponding to that of the encoder ENC. The decoder DEC may determine a weight for the deconvolution filtering by cropping a feature map input to the encoder ENC. The output of the decoder DEC may have the same size as the feature map input to the encoder ENC (e.g., the first feature map FM1) and also may include meaningful information related to a pupil included in the first feature map FM1. As another example, the weight of the decoder DEC may include a set of parameters different from that of the weight of the encoder ENC. The decoder DEC may include the fourth and fifth filters FT4 and FT5.

The filter weight learning unit 210 may perform up-sampling filtering on the third feature map FM3 using the fourth filter FT4 (operation S106 in FIG. 5). The fourth filter FT4 may increase the size of the third feature map FM3, which has been decreased by the encoder ENC, to a size corresponding to the learning image LI. For example, the fourth filter FT4 may remember a position of a pixel value before passing through the encoder ENC and may reflect the position of the pixel value in a fourth feature map FM4.

The filter weight learning unit 210 may include a skip connecting network Skip for connecting the feature map input to the encoder ENC to the feature map obtained by performing up-sampling filtering on the output of the encoder ENC. The skip connecting network Skip may transfer data input to the encoder ENC to the output of the encoder ENC without modification. For example, max-pooling filtering may be performed on the first feature map FM1 by the encoder ENC, and then up-sampling filtering may be performed on the first feature map FM1 by the fourth filter FT4. Also, since the first feature map FM1 is transferred over the skip connecting network Skip, the filtering process by the encoder ENC may be omitted. Also, the first feature map FM1 may be merged with the output of the fourth filter FT4. The skip connecting network Skip may provide, to the decoder DEC, detailed information or incidental information which is included in the first feature map FM1, in addition to the meaningful information related to the pupil or the positional information of the pupil which is included in the feature map FM1.

The filter weight learning unit 210 may merge the filtering result of the fourth filter FT4 with the filtering result of the first filter FT1 (operation S107 in FIG. 5). The filter weight learning unit 210 may merge the first feature map FM1 transferred by the skip connecting network Skip with the feature map output by the fourth filter FT4 to generate the fourth feature map FM4. For example, the feature map output by the fourth filter FT4 may include main information of the learning image LI, and the first feature map FM1 may include both of the main information and incidental information of the learning image LI. Accordingly, by the filter weight learning unit 210 including the skip connecting network Skip, it may be possible to prevent or reduce an error that may occur due to detailed information or incidental information that has been removed in the encoder ENC. Furthermore, by the filter weight learning unit 210 including the skip connecting network Skip, it is also possible to improve weight learning efficiency through appropriate adjustment of the weights of the first to fifth filters FT1 to FT5.

The filter weight learning unit 210 may perform convolution filtering on the fourth feature map FM4 using the fifth filter FT5 (operation S108 in FIG. 5). For example, the fifth filter FT5 may output a fifth feature map FM5 obtained by multiplying each of a plurality of pixels of the fourth feature map FM4 by a weight and then adding the multiplication results. The fifth filter FT5 may perform a dot product between the filter weight and the fourth feature map FM4 by sliding the filter weight on the fourth feature map FM4. The filter weight learning unit 210 may generate a filtered image FI on the basis of the fifth feature map FM5 and compare the filtered image FI to a target image TI. The difference between the filtered image FI and the target image TI may be used to change the weights of the first to fifth filters FT1 to FT5.

The filter weight learning unit 210 may count the number of times weight learning is performed using the first to fifth filters FT1 to FT5 and determine whether the counted number reaches a predetermined number (operation S109 in FIG. 5).

When the number of times weight learning is performed using the first to fifth filters FT1 to FT5 does not reach the predetermined number, the filter weight learning unit 210 may change the weights of the first to fifth filters FT1 to FT5 and then repeat the filtering process using the first to fifth filters FT1 to FT5 (operation S110 in FIG. 5). The filter weight learning unit 210 may change the weights of the first to fifth filters FT1 to FT5 on the basis of a result of comparing the filtered image FI to the target image TI. Accordingly, the accuracy of the weights of the first to fifth filters FT1 to FT5 may increase as the number of learning times increases. By the filter weight learning unit 210 including the first to fifth filters FT1 to FT5, it is possible to improve the accuracy of the weights even when the weight learning is performed a relatively small number of times.

When the number of times weight learning is performed using the first to fifth filters FT1 to FT5 reaches the predetermined number, the filter weight learning unit 210 may store the weights of the first to fifth filters FT1 to FT5 (operation S111 in FIG. 5). The stored weights of the first to fifth filters FT1 to FT5 may be used while the split image generation unit 220 generates a pupil region split image.

Figure 6:
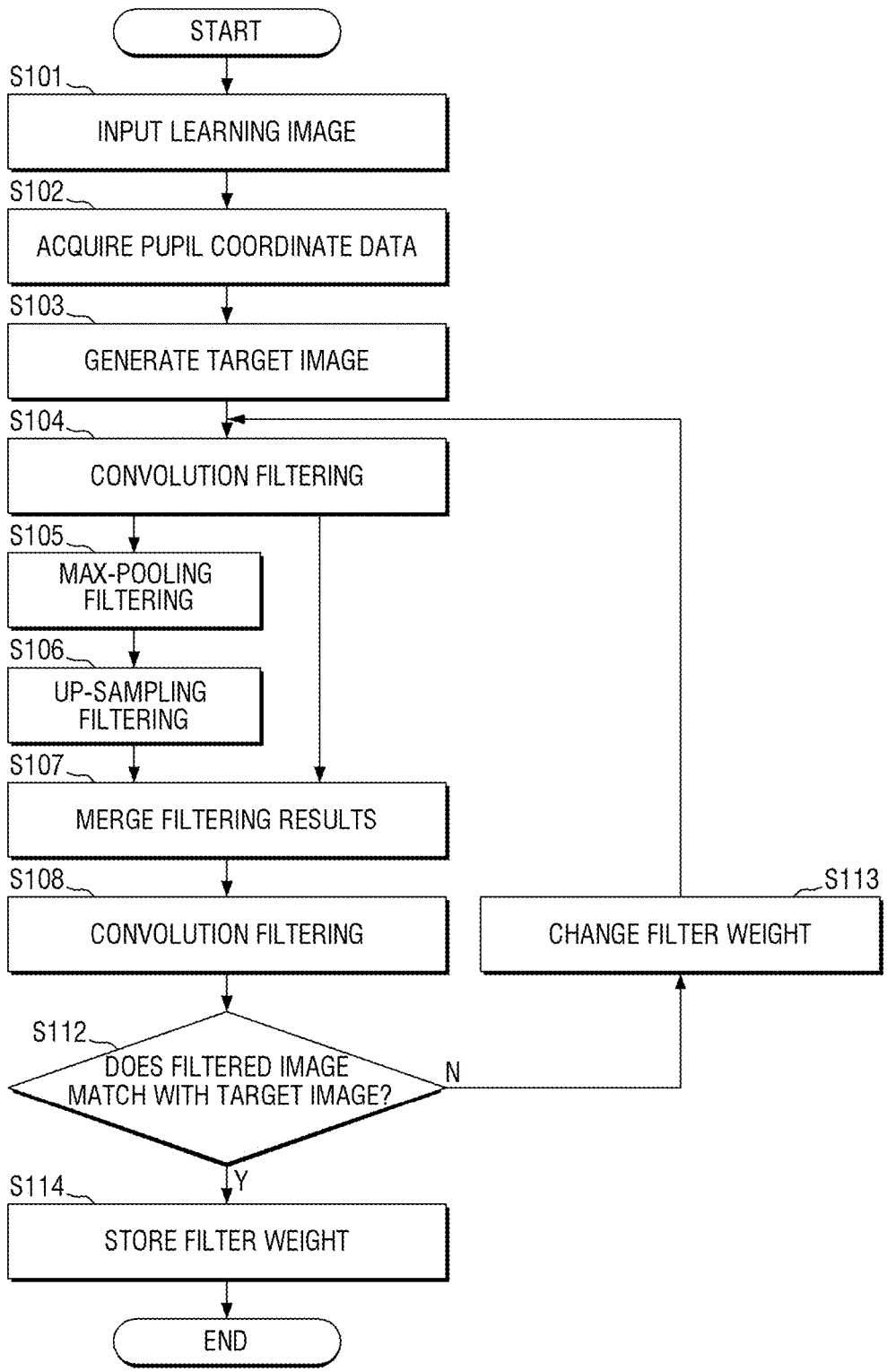
FIG. 6 is another example diagram showing the weight learning process of the filter weight learning unit of FIG. 4.

FIG. 6 is another example diagram showing the weight learning process of the filter weight learning unit of FIG. 4. The weight learning process of FIG. 6 and the weight learning process of FIG. 5 differ only in operation S108 and subsequent operations, and thus the same elements as described above may be described briefly or omitted.

Referring to FIG. 6, the filter weight learning unit 210 may receive a learning image LI (operation S101 in FIG. 6).

The filter weight learning unit 210 may acquire pupil coordinate data from the learning image LI (operation S102 in FIG. 6).

The filter weight learning unit 210 may generate a target image TI on the basis of the pupil coordinate data acquired from the learning image LI (operation S103 in FIG. 6).

The filter weight learning unit 210 may perform convolution filtering on the learning image LI using the first filter FT1 (operation S104 in FIG. 6).

The filter weight learning unit 210 may perform max-pooling filtering on the first feature map FM1 using the encoder ENC (operation S105 in FIG. 6).

The filter weight learning unit 210 may perform up-sampling filtering on the third feature map FM3 using the fourth filter FT4 (operation S106 in FIG. 6).

The filter weight learning unit 210 may merge the filtering result of the fourth filter FT4 with the filtering result of the first filter FT1 (operation S107 in FIG. 6).

The filter weight learning unit 210 may perform convolution filtering on the fourth feature map FM4 using the fifth filter FT5 (operation S108 in FIG. 6).

The filter weight learning unit 210 may determine whether a filtered image FI is identical to the target image TI (operation S112 in FIG. 6). For example, the filter weight learning unit 210 may determine a similarity between the filtered image FI and the target image TI and determine whether the filtered image FI is identical or similar to the target image TI to a certain extent. That is, according to some example embodiments, the system may compare the filtered image FI with the target image TI and determine whether or not the filtered image FI is identical to the target image TI, or similar to (e.g., within a predetermined reference range, for example, of the grayscale values of the pixels of the filtered image FI compared to the target image TI) the target image TI.

When the comparison results between the filtered image FI and the target image TI does not satisfy a predetermined reference amount, the filter weight learning unit 210 may change the weights of the first to fifth filters FT1 to FT5 and then repeat the filtering process using the first to fifth filters FT1 to FT5 (operation S113 in FIG. 6). When the similarity between the filtered image FI and the target image TI does not satisfy a predetermined reference, the filter weight learning unit 210 may change the weights of the first to fifth filters FT1 to FT5 on the basis of the comparison result between the filtered image FI and the target image TI. Accordingly, the accuracy of the weights of the first to fifth filters FT1 to FT5 may increase as the number of learning times increases. By the filter weight learning unit 210 including the first to fifth filters FT1 to FT5, it is possible to improve the accuracy of the weights even when the weight learning is performed a relatively small number of times.

When the comparison result between the filtered image FI and the target image TI satisfies the predetermined reference, the filter weight learning unit 210 may store the weights of the first to fifth filters FT1 to FT5 (operation S114 in FIG. 6). The stored weights of the first to fifth filters FT1 to FT5 may be used while the split image generation unit 220 generates a pupil region split image.

Figure 7:
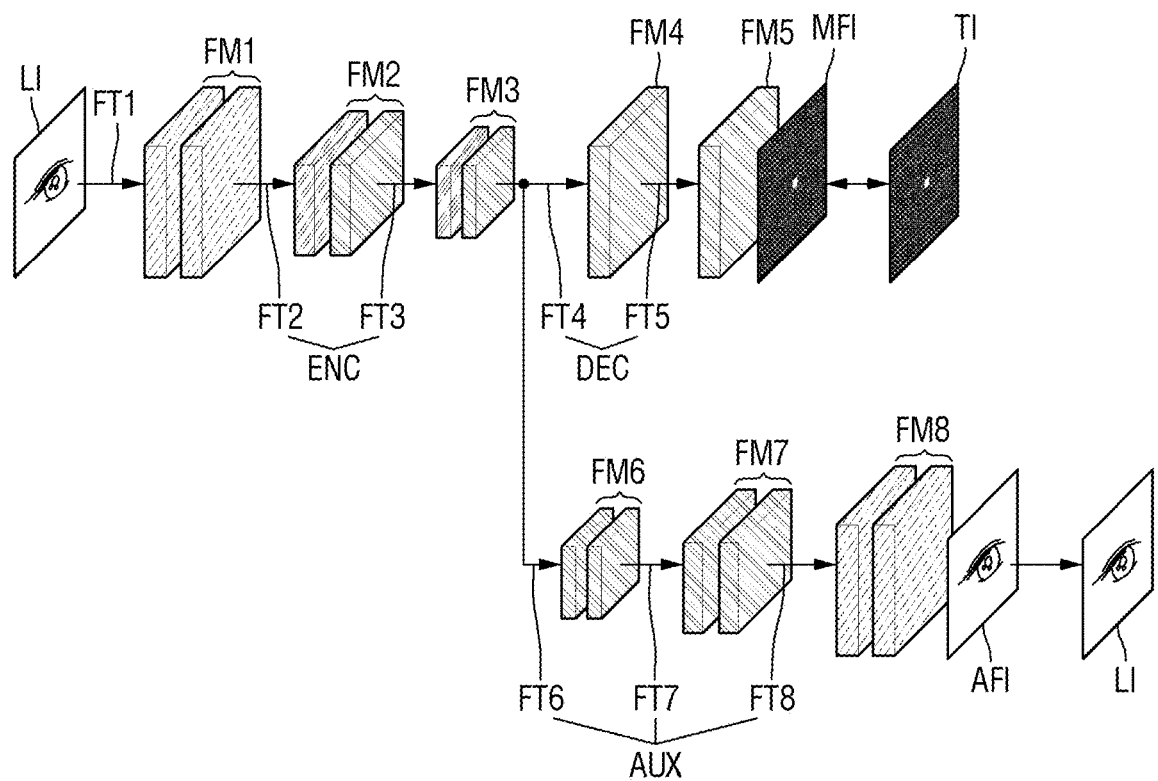
FIG. 7 is a diagram showing a plurality of filters of a filter weight learning unit according to some example embodiments.
Figure 8:
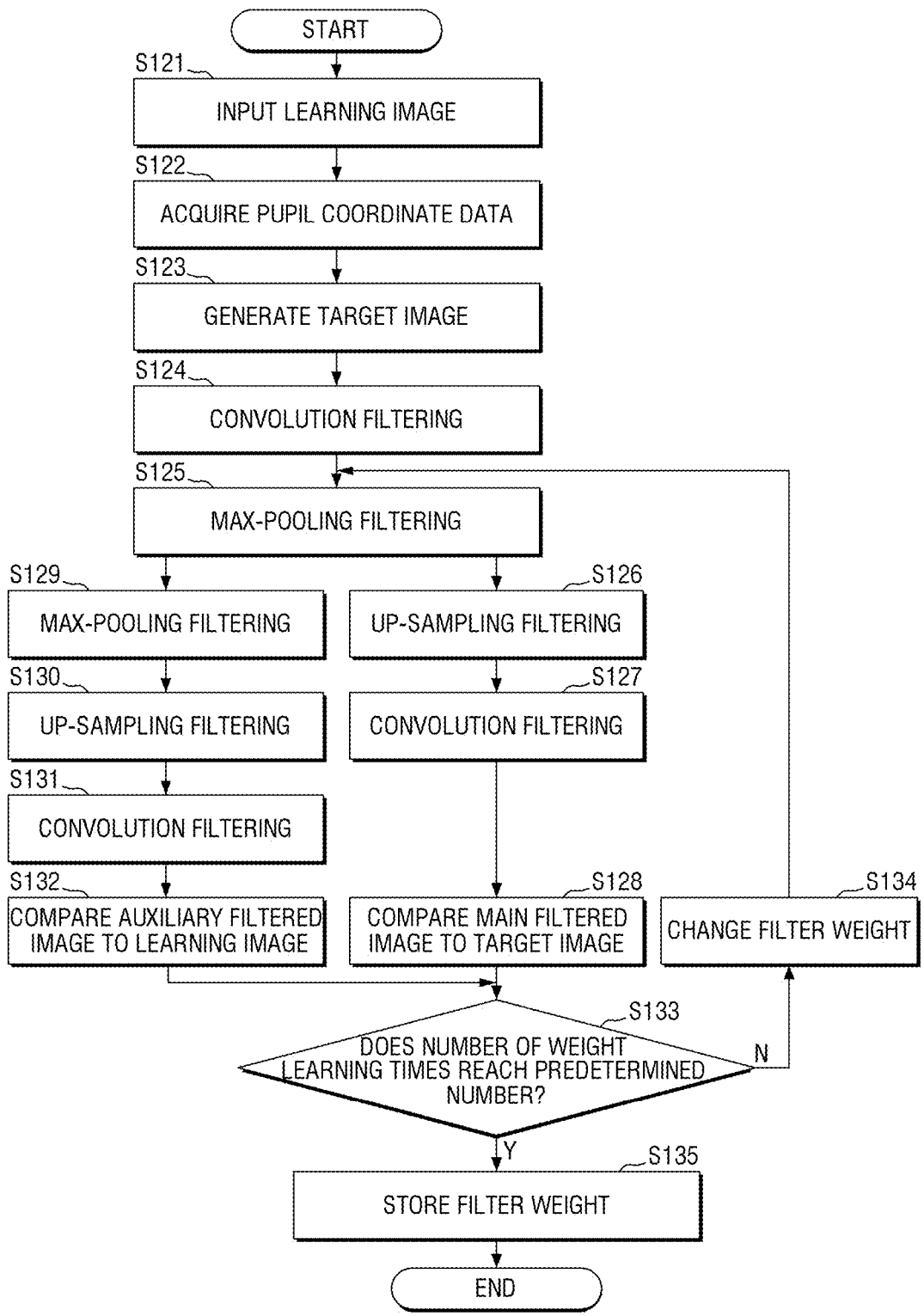
FIG. 8 is an example diagram illustrating a weight learning process of the filter weight learning unit of FIG. 7.

FIG. 7 is a diagram showing a plurality of filters of a filter weight learning unit according to some example embodiments, and FIG. 8 is an example diagram illustrating a weight learning process of the filter weight learning unit of FIG. 7.

Referring to FIGS. 7 and 8, the filter weight learning unit 210 may generate a target image TI on the basis of pupil coordinate data acquired from a learning image LI. The filter weight learning unit 210 may generate a main filtered image MFI and an auxiliary filtered image AFI by filtering the learning image LI using a plurality of filters FT1 to FT8. The filter weight learning unit 210 may learn the weights of the plurality of filters FT1 to FT8 in order to make the main filtered image MFI similar to the target image TI to a predetermined reference.

The filter weight learning unit 210 may receive a learning image LI (operation S121 in FIG. 8). Here, the learning image LI may include various images including meaningful information related to a pupil (for example, spatial information of a pupil) or positional information of a pupil. The filter weight learning unit 210 may improve the accuracy of the learning of the weights of the plurality of filters FT1 to FT8. By the learning image LI including various images, the pupil detection device 10 may improve performance of detecting pupil coordinates from various input images.

The filter weight learning unit 210 may acquire pupil coordinate data from the learning image LI (operation S122 in FIG. 8). Here, the pupil coordinate data may correspond to coordinate data of a pixel matching with a pupil center among a plurality of pixels in a pupil region. The filter weight learning unit 210 may label the learning image LI to acquire the pupil coordinate data. For example, the learning image LI may be labeled by a user who selects or designates the pupil center from the learning image LI.

The filter weight learning unit 210 may generate a target image TI on the basis of the pupil coordinate data acquired from the learning image LI (operation S123 in FIG. 8). The filter weight learning unit 210 may expand the pupil coordinate data to a certain range from the pupil center. For example, a pixel value within the expanded range may be equal to the pixel value of the pupil center. Accordingly, a pixel within the expanded range in the pupil region may have the maximum pixel value (e.g., a pixel value of 255).

The filter weight learning unit 210 may perform Gaussian filtering on the expanded pupil coordinate data to generate the target image TI. For example, the target image TI may have the maximum pixel value (e.g., a pixel value of 255) at the pupil center through the Gaussian filtering, and the pixel value may decrease in a direction away from the pupil center. The target image TI may include meaningful information related to the pupil (e.g., spatial information of the pupil) on the basis of the maximum pixel value and the distribution area of the expanded pupil coordinate data.

The plurality of filters FT1 to FT8 may include first to eighth filters FT1 to FT8, and each of the first to eighth filters FT1 to FT8 may be implemented as one of a convolution filter, a max-pooling filter, and an up-sampling filter. For example, the pupil detection device 10 may implement a convolutional neural network by including a plurality of filters including at least one convolution filter, at least one max-pooling filter, and at least one up-sampling filter. By the plurality of filters FT1 to FT8 implemented in the convolutional neural network, it is possible to implement complex non-linear models and improve image processing performance or speech processing performance. For example, the plurality of filters may output the meaningful information related to the pupil and the positional information of the pupil by maintaining 2D or 3D data included in the input image as it is.

The following description focuses on an embodiment in which the first and fifth filters FT1 and FT5 are implemented as convolution filters, the second, third, and sixth filters FT2, FT3, and FT6 are implemented as max-pooling filters, and the fourth, seventh, and eighth filters FT4, FT7, and FT8 are implemented as up-sampling filters. However, the configuration of the plurality of filters is not limited to the above embodiment.

By being implemented as convolution filters, the first and fifth filters FT1 and FT5 may each perform weighted convolution filtering on an input image or an input feature map to output a feature map. For example, the first and fifth filters FT1 and FT5 may change the current pixel value by multiplying each of a plurality of pixels of the input image data by a weight and then adding the multiplication results. The first and fifth filters FT1 and FT5 may each perform a dot product between the filter weight and the image data by sliding the filter weight on the image data. Accordingly, the first and fifth filters FT1 and FT5 may output a feature map having a specific pattern for a specific position of the input feature map or the input image. The specific pattern included in the feature map may be used as the meaningful information related to the pupil or the positional information of the pupil.

By being implemented as max-pooling filters, the second, third, and sixth filters FT2, FT3, and FT6 may extract a main pixel value from the input feature map to output a small feature map. For example, the second, third, and sixth filters FT2, FT3, and FT6 may decrease the size of the feature map by extracting the maximum pixel value from each of a plurality of partial regions of the input feature map and removing the remaining pixel values. Accordingly, the second, third, and sixth filters FT2, FT3, and FT6 may prevent local minor changes in pixel values of the feature map from affecting output data.

By being implemented as up-sampling filters, the fourth, seventh, and eighth filters FT4, FT7, and FT8 may perform up-sampling on the max-pooling results. The fourth filter FT4 may increase the size of the feature map, which has been decreased by the second and third filters FT2 and FT3, to a size corresponding to the input image. For example, the fourth filter FT4 may restore the feature map by remembering the position of the pixel value before passing through the second filter FT2. The pixel values that have been removed by the second and third filters FT2 and FT3 may not be recovered again by the fourth filter FT4.

The seventh and eighth filters FT7 and FT8 may increase the size of the feature map, which has been decreased by the second, third, and sixth filters FT2, FT3, and FT6, to a size corresponding to the input image. For example, the seventh and eighth filters FT7 and FT8 may restore the feature map by remembering the position of the pixel value before passing through the second filter FT2. The pixel values that have been removed by the second, third, and sixth filters FT2, FT3, and FT6 may not be recovered again by the seventh and eighth filters FT7 and FT8.

As another example, the fourth, seventh, and eighth filters FT4, FT7, and FT8 may perform up-sampling through deconvolution.

The filter weight learning unit 210 may perform convolution filtering on the learning image LI using the first filter FT1 (operation S124 in FIG. 8). For example, the first filter FT1 may output a first feature map FM1 obtained by multiplying each of a plurality of pixels of the learning image LI by a weight and then adding the multiplication results. The first filter FT1 may perform a dot product between the filter weight and the image data by sliding the filter weight on the learning image LI.

The filter weight learning unit 210 may perform max-pooling filtering on the first feature map FM1 using the second filter FT2 (operation S125 in FIG. 8). The encoder ENC may include the second and third filters FT2 and FT3.

The filter weight learning unit 210 may perform max-pooling filtering on the first feature map FM1 using the second filter FT2. The second filter FT2 may extract a main pixel value from the first feature map FM1 and output a second feature map FM2 having a small size. For example, the second filter FT2 may decrease the size of the second feature map FM2 by extracting the maximum pixel value from each of a plurality of partial regions of the first feature map FM1 and removing the remaining pixel values.

The filter weight learning unit 210 may perform max-pooling filtering on the second feature map FM2 using the third filter FT3. The third filter FT3 may extract a main pixel value from the second feature map FM2 and output a third feature map FM3 having a small size. For example, the third filter FT3 may decrease the size of the third feature map FM3 by extracting the maximum pixel value from each of a plurality of partial regions of the second feature map FM2 and removing the remaining pixel values.

The filter weight learning unit 210 may perform deconvolution filtering on the feature map filtered by the encoder ENC using a decoder DEC. For example, the decoder DEC may have a weight corresponding to that of the encoder ENC. The decoder DEC may determine a weight for the deconvolution filtering by cropping a feature map input to the encoder ENC. The output of the decoder DEC may have the same size as the feature map input to the encoder ENC (e.g., the first feature map FM1) and also may include meaningful information related to a pupil included in the first feature map FM1. As another example, the weight of the decoder DEC may be composed of a set of parameters different from that of the weight of the encoder ENC. The decoder DEC may include the fourth and fifth filters FT4 and FT5.

The filter weight learning unit 210 may perform up-sampling filtering on the third feature map FM3 using the fourth filter FT4 (operation S126 in FIG. 8). The fourth filter FT4 may increase the size of the third feature map FM3, which has been decreased by the encoder ENC, to a size corresponding to the learning image LI. For example, the fourth filter FT4 may remember a position of a pixel value before passing through the encoder ENC and may reflect the position of the pixel value in a fourth feature map FM4.

The filter weight learning unit 210 may perform convolution filtering on the fourth feature map FM4 using the fifth filter FT5 (operation S127 in FIG. 8). For example, the fifth filter FT5 may output a fifth feature map FM5 obtained by multiplying each of a plurality of pixels of the fourth feature map FM4 by a weight and then adding the multiplication results. The fifth filter FT5 may perform a dot product between the filter weight and the fourth feature map FM4 by sliding the filter weight on the fourth feature map FM4. The filter weight learning unit 210 may generate a main filtered image MFI on the basis of the fifth feature map FM5.

The filter weight learning unit 210 may compare the main filtered image MFI to the target image TI (operation S128 in FIG. 8). The difference between the main filtered image MFI and the target image TI may be used to change the weights of the first to eighth filters FT1 to FT8.

The filter weight learning unit 210 may perform deconvolution filtering on the feature map filtered by the encoder ENC using an auxiliary filter AUX. The auxiliary filter AUX is connected to the encoder ENC and thus may function as an auto-encoder. By further including the auxiliary filter AUX, the filter weight learning unit 210 may reproduce an auxiliary filtered image AFI similar to the learning image LI.

The auto-encoder may extract various features of the learning image LI by compressing data of the learning image LI and may produce the auxiliary filtered image AFI as similar as possible to the learning image LI on the basis of the extracted various features. The auto-encoder can complement accuracy of weight learning for the convolutional neural network composed of the encoder ENC and the decoder DEC. Accordingly, by comparing the auxiliary filtered image AFI output by the encoder ENC and the auxiliary filter AUX to the learning image LI, the filter weight learning unit 210 may improve the promptness and accuracy of a process of the main filtered image MFI reaching the target image TI. The auxiliary filter AUX may include the sixth to eighth filters FT6 to FT8.

The filter weight learning unit 210 may perform max-pooling filtering on the third feature map FM3 using the sixth filter FT6 (operation S129 in FIG. 8). The sixth filter FT6 may extract a main pixel value from the third feature map FM3 and output a sixth feature map FM6 having a small size. For example, the sixth filter FT6 may decrease the size of the sixth feature map FM6 by extracting the maximum pixel value from each of a plurality of partial regions of the third feature map FM3 and removing the remaining pixel values.

The filter weight learning unit 210 may perform up-sampling filtering on the sixth feature map FM6 using the seventh and eighth filters FT7 and FT8 (operation S130 in FIG. 8). The filter weight learning unit 210 may generate the auxiliary filtered image AFI on the basis of an eighth feature map FM8 on which up-sampling filtering is performed by the seventh and eighth filters FT7 and FT8.

The filter weight learning unit 210 may perform up-sampling filtering on the sixth feature map FM6 using the seventh filter FT7 and then output a seventh feature map FM7. The filter weight learning unit 210 may perform up-sampling filtering on the seventh feature map FM7 using the eighth filter FT8 and then output an eighth feature map FM8. The seventh and eighth filters FT7 and FT8 may increase the size of the sixth feature map FM6, which has been decreased by the encoder ENC and the sixth filter FT6, to a size corresponding to the learning image LI. For example, the seventh and eighth filters FT7 and FT8 may remember a position of a pixel value before passing through the encoder ENC and may reflect the position of the pixel value in the eighth feature map FM8.

The filter weight learning unit 210 may generate an auxiliary filtered image AFI by performing convolution filtering on the eighth feature map FM8 (operation S131 in FIG. 8). For example, the filter weight learning unit 210 may perform a dot product between the filter weight and the eighth feature map FM8 by sliding a convolution filter on the eighth feature map FM8.

The filter weight learning unit 210 may compare the auxiliary filtered image AFI to the learning image LI (operation S132 in FIG. 8). The difference between the auxiliary filtered image AFI and the learning image LI may be used to change the weights of the first to eighth filters FT1 to FT8.

The filter weight learning unit 210 may count the number of times weight learning is performed using the first to eighth filters FT1 to FT8 and determine whether the counted number reaches a predetermined number (operation S133 in FIG. 8).

When the number of times weight learning is performed using the first to eighth filters FT1 to FT8 does not reach the predetermined number, the filter weight learning unit 210 may change the weights of the first to eighth filters FT1 to FT8 and then repeat the filtering process using the first to eighth filters FT1 to FT8 (operation S134 in FIG. 8). The filter weight learning unit 210 may change the weights of the first to eighth filters FT1 to FT8 on the basis of a loss function Loss calculated based on the target image TI, the main filtered image MFI, the learning image LI, and the auxiliary filtered image AFI. Accordingly, the accuracy of the weights of the first to eighth filters FT1 to FT8 may increase as the number of learning times increases. By the filter weight learning unit 210 including the first to eighth filters FT1 to FT8, it is possible to improve the accuracy of the weights even when the weight learning is performed a relatively small number of times.

When the number of times weight learning is performed using the first to eighth filters FT1 to FT8 reaches the predetermined number, the filter weight learning unit 210 may store the weights of the first to eighth filters FT1 to FT8 (operation S135 in FIG. 8). The stored weights of the first to eighth filters FT1 to FT8 may be used while the split image generation unit 220 generates a pupil region split image.

Figure 9:
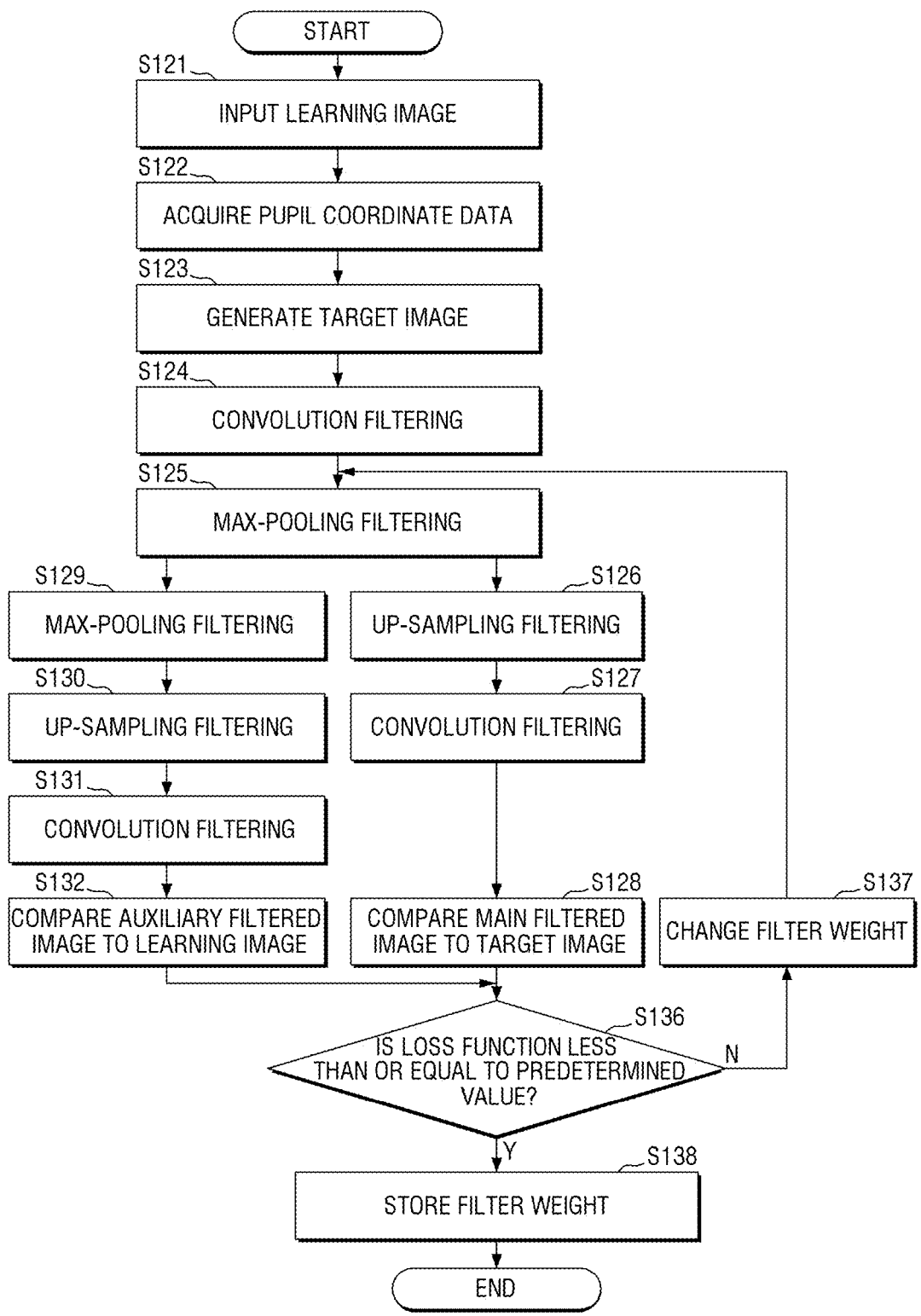
FIG. 9 is another example diagram illustrating a weight learning process of the filter weight learning unit of FIG. 7.

FIG. 9 is another example diagram illustrating a weight learning process of the filter weight learning unit of FIG. 7. The weight learning process of FIG. 9 and the weight learning process of FIG. 8 differ only in operation S132 and subsequent operations, and thus the same elements as described above will be described briefly or omitted.

Referring to FIG. 9, the filter weight learning unit 210 may receive a learning image LI (operation S121 in FIG. 9).

The filter weight learning unit 210 may acquire pupil coordinate data from the learning image LI (operation S122 in FIG. 9).

The filter weight learning unit 210 may generate a target image TI on the basis of the pupil coordinate data acquired from the learning image LI (operation S123 in FIG. 9).

The filter weight learning unit 210 may perform convolution filtering on the learning image LI using the first filter FT1 (operation S124 in FIG. 9).

The filter weight learning unit 210 may perform max-pooling filtering on a first feature map FM1 using the encoder ENC (operation S125 in FIG. 9).

The filter weight learning unit 210 may perform up-sampling filtering on a third feature map FM3 using the fourth filter FT4 (operation S126 in FIG. 9).

The filter weight learning unit 210 may perform convolution filtering on a fourth feature map FM4 using the fifth filter FT5 (operation S127 in FIG. 9).

The filter weight learning unit 210 may compare a main filtered image MFI to the target image TI (operation S128 in FIG. 9).

The filter weight learning unit 210 may perform max-pooling filtering on the third feature map FM3 using the sixth filter FT6 (operation S129 in FIG. 9).

The filter weight learning unit 210 may perform up-sampling filtering on a sixth feature map FM6 using the seventh and eighth filters FT7 and FT8 (operation S130 in FIG. 9).

The filter weight learning unit 210 may generate an auxiliary filtered image AFI by performing convolution filtering on an eighth feature map FM8 (operation S131 in FIG. 9).

The filter weight learning unit 210 may compare the auxiliary filtered image AFI to the learning image LI (operation S132 in FIG. 9).

The filter weight learning unit 210 may determine whether a loss function Loss calculated based on the target image TI, the main filtered image MFI, the learning image LI, and the auxiliary filtered image AFI is less than or equal to a predetermined value (operation S136 in FIG. 9).

When the loss function Loss exceeds the predetermined value, the filter weight learning unit 210 may change the weights of the first to eighth filters FT1 to FT8 and then repeat the filtering process using the first to eighth filters FT1 to FT8 (operation S137 in FIG. 9). The filter weight learning unit 210 may change the weights of the first to eighth filters FT1 to FT8 on the basis of the loss function Loss. Accordingly, the accuracy of the weights of the first to eighth filters FT1 to FT8 may increase as the number of learning times increases. By the filter weight learning unit 210 including the first to eighth filters FT1 to FT8, it is possible to improve the accuracy of the weights even when the weight learning is performed a relatively small number of times.

When the loss function Loss is less than or equal to the predetermined value, the filter weight learning unit 210 may store the weights of the first to eighth filters FT1 to FT8 (operation S138 in FIG. 9). The stored weights of the first to eighth filters FT1 to FT8 may be used while the split image generation unit 220 generates a pupil region split image.

Figure 10:
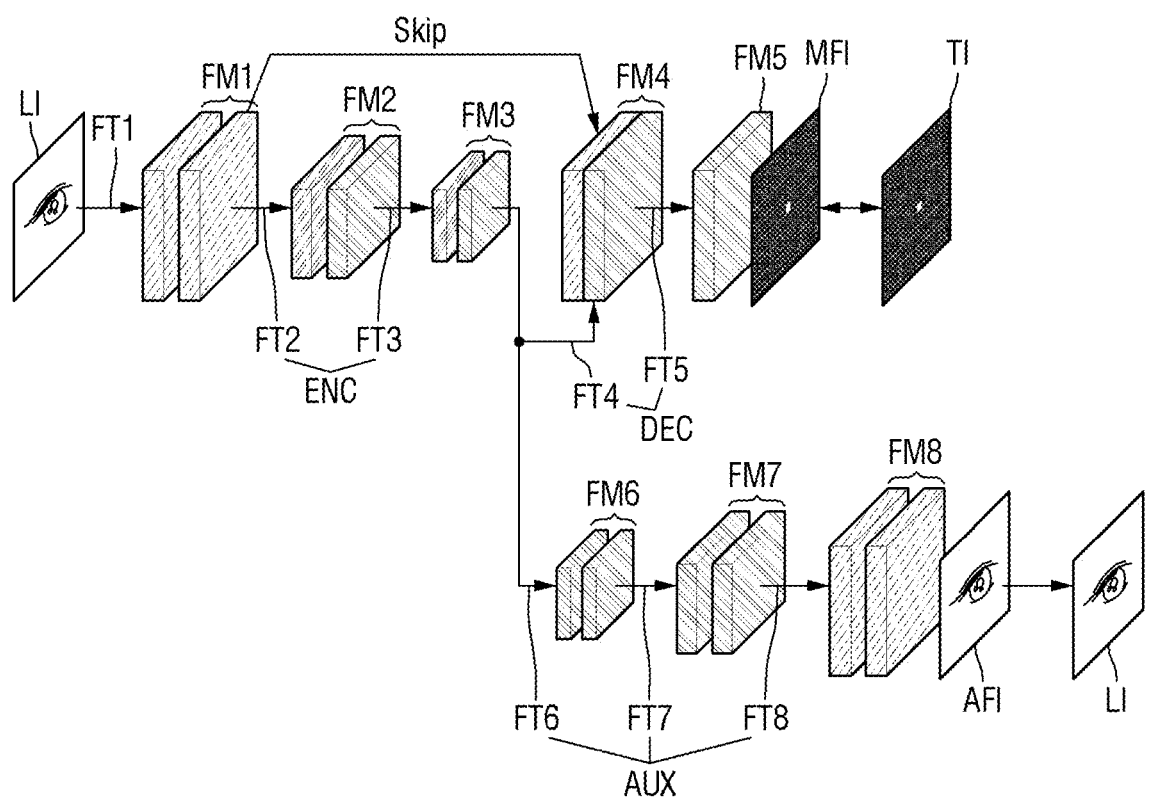
FIG. 10 is a diagram showing a plurality of filters of a filter weight learning unit according to some example embodiments.
Figure 11:
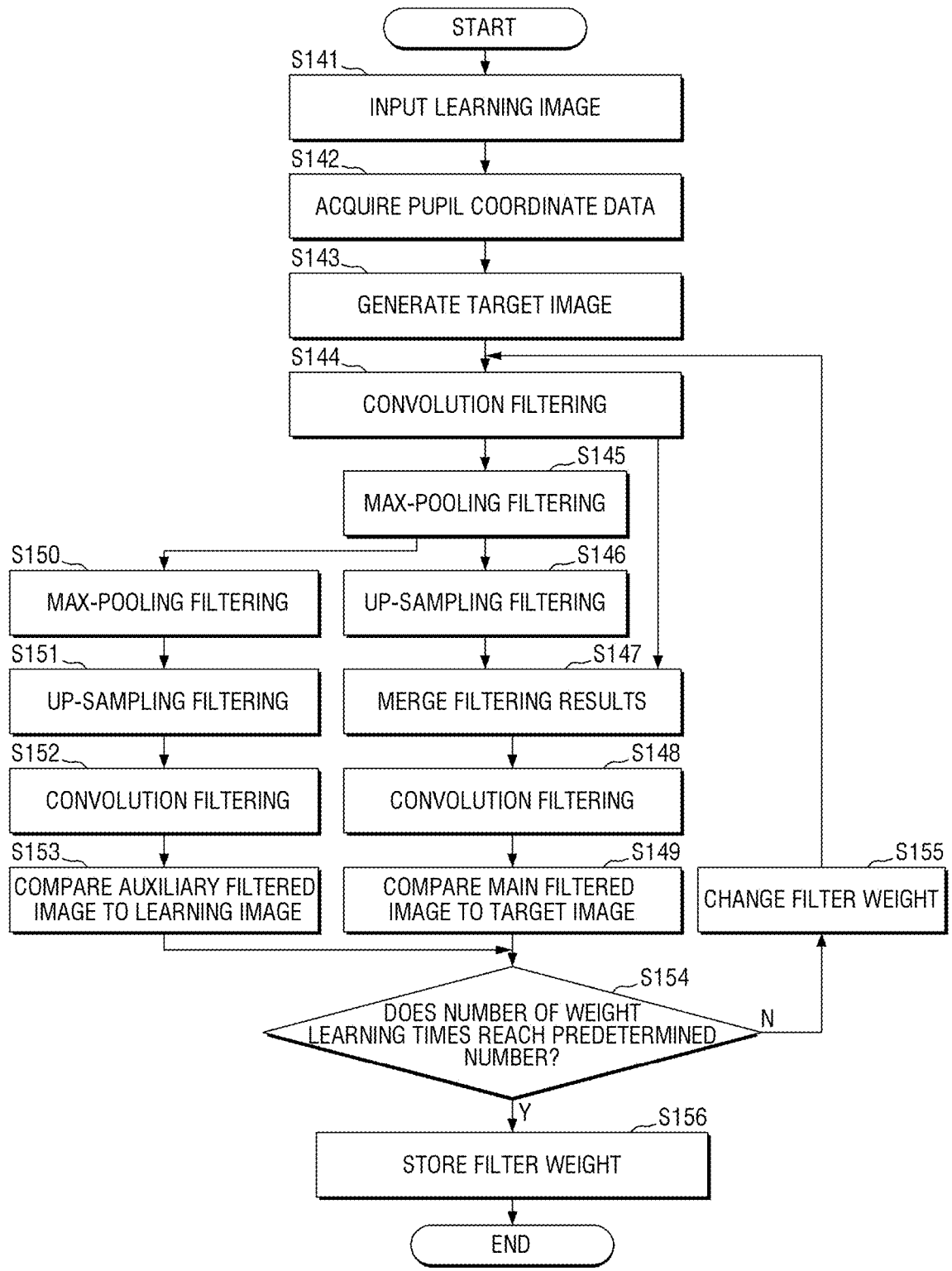
FIG. 11 is an example diagram illustrating a weight learning process of the filter weight learning unit of FIG. 10.

FIG. 10 is a diagram showing a plurality of filters of a filter weight learning unit according to some example embodiments, and FIG. 11 is an example diagram illustrating a weight learning process of the filter weight learning unit of FIG. 10. The weight learning process of FIGS. 10 and 11 differs from the weight learning process of FIGS. 7 and 8 by further including a skip connecting network Skip, and thus the same elements as described above will be described briefly or omitted.

Referring to FIGS. 10 and 11, the filter weight learning unit 210 may receive a learning image LI (operation S141 in FIG. 11).

The filter weight learning unit 210 may acquire pupil coordinate data from the learning image LI (operation S142 in FIG. 11).

The filter weight learning unit 210 may generate a target image TI on the basis of the pupil coordinate data acquired from the learning image LI (operation S143 in FIG. 11).

The filter weight learning unit 210 may perform convolution filtering on the learning image LI using the first filter FT1 (operation S144 in FIG. 11).

The filter weight learning unit 210 may perform max-pooling filtering on a first feature map FM1 using the encoder ENC (operation S145 in FIG. 11).

The filter weight learning unit 210 may perform up-sampling filtering on a third feature map FM3 using the fourth filter FT4 (operation S146 in FIG. 11).

The filter weight learning unit 210 may include a skip connecting network Skip for connecting the feature map input to the encoder ENC to the feature map obtained by performing up-sampling filtering on the output of the encoder ENC. The skip connecting network Skip may transfer data input to the encoder ENC to the output of the encoder ENC without modification. For example, max-pooling filtering may be performed on the first feature map FM1 by the encoder ENC, and then up-sampling filtering may be performed on the first feature map FM1 by the fourth filter FT4. Also, because the first feature map FM1 is transferred over the skip connecting network Skip, the filtering process by the encoder ENC may be omitted. Also, the first feature map FM1 may be merged with the output of the fourth filter FT4. The skip connecting network Skip may provide, to the decoder DEC, detailed information or incidental information which is included in the first feature map FM1, in addition to the meaningful information related to the pupil or the positional information of the pupil which is included in the feature map FM1.

The filter weight learning unit 210 may merge the filtering result of the fourth filter FT4 with the filtering result of the first filter FT1 (operation S147 in FIG. 11). The filter weight learning unit 210 may merge the first feature map FM1 transferred by the skip connecting network Skip with the feature map output by the fourth filter FT4 to generate a fourth feature map FM4. For example, the feature map output by the fourth filter FT4 may include main information of the learning image LI, and the first feature map FM1 may include both of the main information and incidental information of the learning image LI. Accordingly, by the filter weight learning unit 210 including the skip connecting network Skip, it is possible to prevent an error that may occur due to detailed information or incidental information that has been removed in the encoder ENC. Furthermore, by the filter weight learning unit 210 including the skip connecting network Skip, it is also possible to improve weight learning efficiency through appropriate adjustment of the weights of the first to eighth filters FT1 to FT8.

The filter weight learning unit 210 may perform convolution filtering on the fourth feature map FM4 using the fifth filter FT5 (operation S148 in FIG. 11).

The filter weight learning unit 210 may compare a main filtered image MFI to the target image TI (operation S149 in FIG. 11).

The filter weight learning unit 210 may perform max-pooling filtering on the third feature map FM3 using the sixth filter FT6 (operation S150 in FIG. 11).

The filter weight learning unit 210 may perform up-sampling filtering on a sixth feature map FM6 using the seventh and eighth filters FT7 and FT8 (operation S151 in FIG. 11).

The filter weight learning unit 210 may generate an auxiliary filtered image AFI by performing convolution filtering on an eighth feature map FM8 (operation S152 in FIG. 11).

The filter weight learning unit 210 may compare the auxiliary filtered image AFI to the learning image LI (operation S153 in FIG. 11).

The filter weight learning unit 210 may count the number of times weight learning is performed using the first to eighth filters FT1 to FT8 and determine whether the counted number reaches a predetermined number (operation S154 in FIG. 11).

When the number of times weight learning is performed using the first to eighth filters FT1 to FT8 does not reach the predetermined number, the filter weight learning unit 210 may change the weights of the first to eighth filters FT1 to FT8 and then repeat the filtering process using the first to eighth filters FT1 to FT8 (operation S155 in FIG. 11). The filter weight learning unit 210 may change the weights of the first to eighth filters FT1 to FT8 on the basis of a loss function Loss calculated based on the target image TI, the main filtered image MFI, the learning image LI, and the auxiliary filtered image AFI. For example, the loss function Loss may be defined as Equation 1 below.

$$\text{Loss} = \mathbb{E}_{x \sim P_{data}(x)}[\|y - \hat{y}(x)\|_2] + \mathbb{E}_{x \sim P_{data}(x)}[\|x - \tilde{y}\|_2] \quad \text{[Equation 1]}$$

Here, "x" is a learning image LI, "$P_{data}(x)$" is a learning data set, "$\mathbb{E}_{x \sim P_{data}(x)}$" is an expected value calculated by extracting samples from a sample space formed by a probability distribution "$P_{data}$" for the random variable "x," "y" is a target image TI, "$\hat{y}$" is a main filtered image MFI, and "$\tilde{y}$" is an auxiliary filtered image AFI. Accordingly, the filter weight learning unit 210 may calculate the loss function Loss by adding an expected value of the distance between a pupil center based on the target image TI and a pupil center based on the main filtered image MFI and an expected value of the distance between a pupil center based on the learning image LI and a pupil center based on the auxiliary filtered image AFI.

As a result, by the filter weight learning unit 210 including the encoder ENC, the decoder DEC, and the auxiliary filter AUX, it is possible to accurately learn the weights for a plurality of filters, and also it is possible to remove false detections for various input images, thereby improving detection performance.

When the number of times weight learning is performed using the first to eighth filters FT1 to FT8 reaches the predetermined number, the filter weight learning unit 210 may store the weights of the first to eighth filters FT1 to FT8 (operation S156 in FIG. 11).

Figure 12:
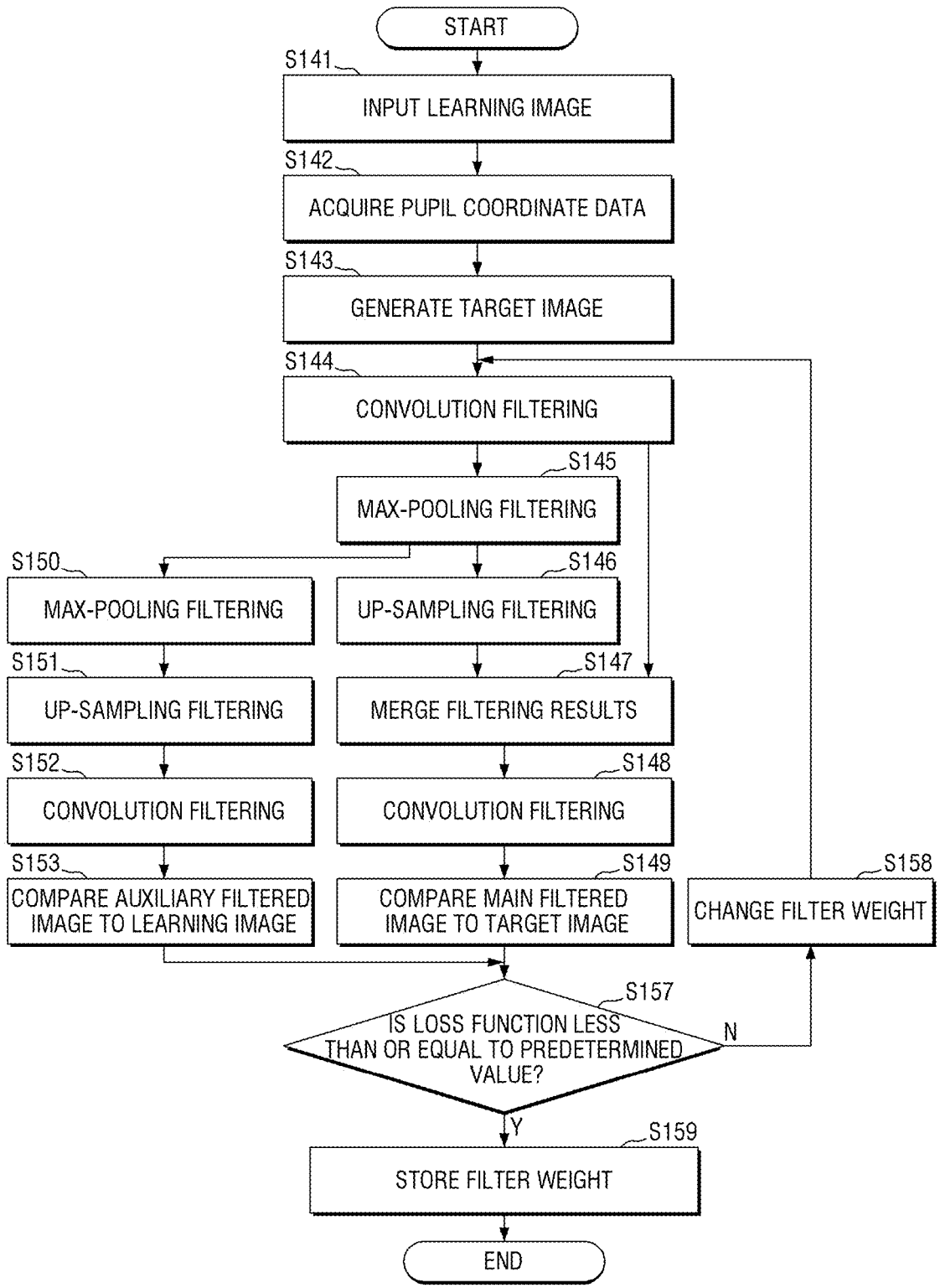
FIG. 12 is another example diagram illustrating a weight learning process of the filter weight learning unit of FIG. 10.

FIG. 12 is another example diagram illustrating a weight learning process of the filter weight learning unit of FIG. 10. The weight learning process of FIG. 12 and the weight learning process of FIG. 11 differ only in operation S153 and subsequent operations, and thus the same elements as described above will be described briefly or omitted.

Referring to FIG. 12, the filter weight learning unit 210 may determine whether the loss function Loss calculated based on the target image TI, the main filtered image MFI, the learning image LI, and the auxiliary filtered image AFI is less than or equal to a predetermined value (operation S157 in FIG. 12).

When the loss function Loss exceeds the predetermined value, the filter weight learning unit 210 may change the weights of the first to eighth filters FT1 to FT8 and then repeat the filtering process using the first to eighth filters FT1 to FT8 (operation S158 in FIG. 12). The filter weight learning unit 210 may change the weights of the first to eighth filters FT1 to FT8 on the basis of the loss function Loss. Accordingly, the accuracy of the weights of the first to eighth filters FT1 to FT8 may increase as the number of learning times increases. By the filter weight learning unit 210 including the first to eighth filters FT1 to FT8, it is possible to improve the accuracy of the weights even when the weight learning is performed a relatively small number of times.

When the loss function Loss is less than or equal to the predetermined value, the filter weight learning unit 210 may store the weights of the first to eighth filters FT1 to FT8 (operation S159 in FIG. 12). The stored weights of the first to eighth filters FT1 to FT8 may be used while the split image generation unit 220 generates a pupil region split image.

Figure 13:
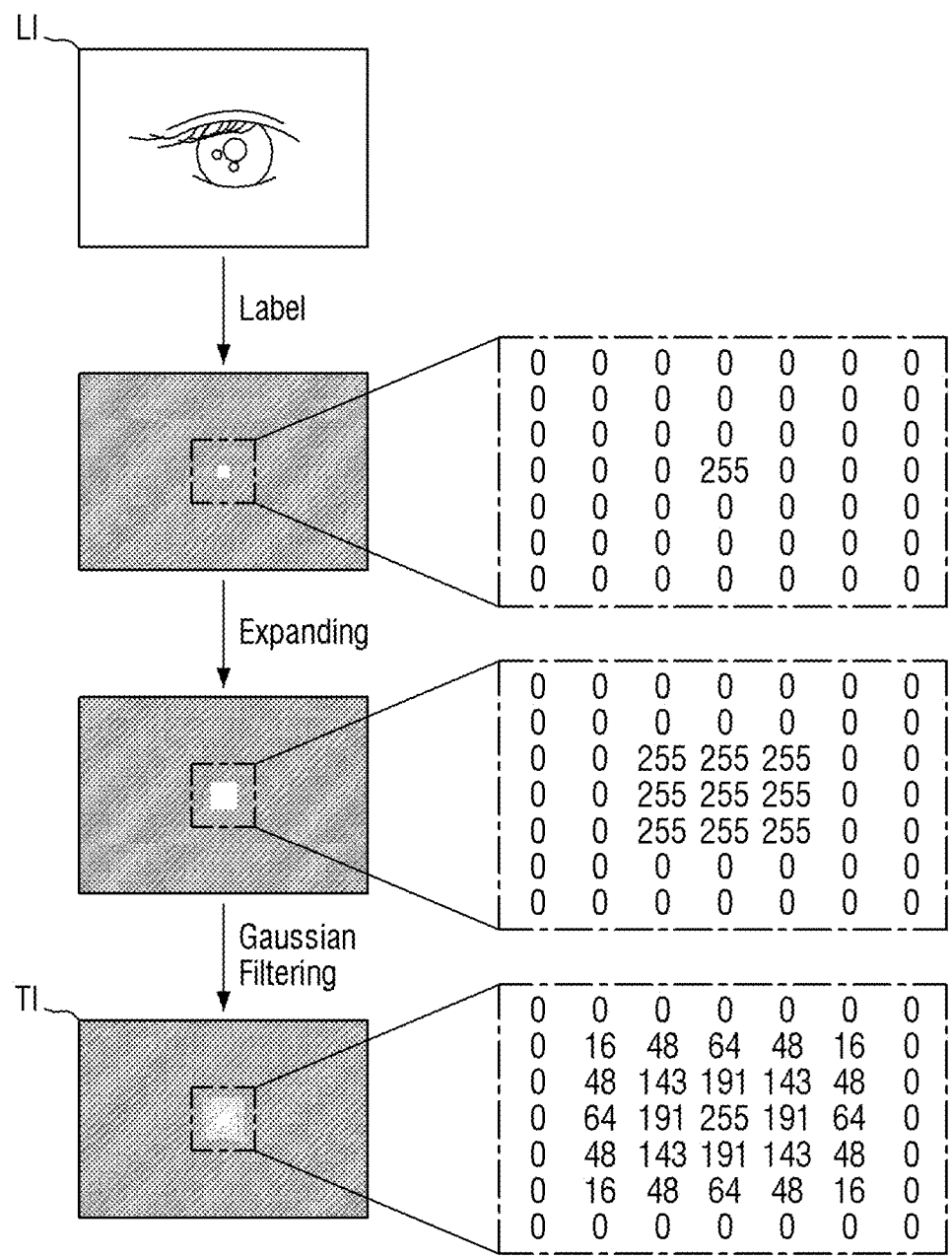
FIG. 13 is a diagram showing a target image generating process of the filter weight learning unit according to some example embodiments.
Figure 14:
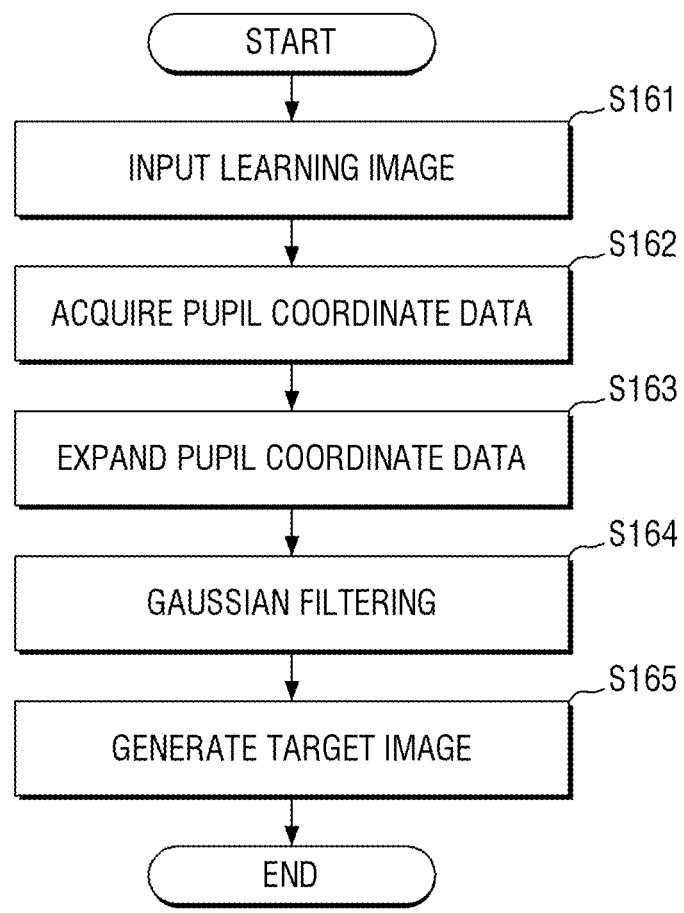
FIG. 14 is a flowchart illustrating the target image generating process of the filter weight learning unit according to some example embodiments.

FIG. 13 is a diagram showing a target image generating process of the filter weight learning unit according to some example embodiments. FIG. 14 is a flowchart illustrating the target image generating process of the filter weight learning unit according to an embodiment.

Referring to FIGS. 13 and 14, the filter weight learning unit 210 may receive a learning image LI (operation S161 in FIG. 14). Here, the learning image LI may include various images including meaningful information related to a pupil (for example, spatial information of a pupil) or positional information of a pupil. The filter weight learning unit 210 may improve the accuracy of the learning of the weights of the plurality of filters FT1 to FT8. By the learning image LI including various images, the pupil detection device 10 may improve performance of detecting pupil coordinates from various input images.

The filter weight learning unit 210 may perform labeling to acquire pupil coordinate data from the learning image LI (operation S162 in FIG. 14). Here, the pupil coordinate data may correspond to coordinate data of a pixel matching with a pupil center among a plurality of pixels in a pupil region. The filter weight learning unit 210 may label the learning image LI to acquire the pupil coordinate data. For example, the learning image LI may be labeled by a user who selects or designates the pupil center from the learning image LI.

The filter weight learning unit 210 may expand the pupil coordinate data acquired from the learning image LI (operation S163 in FIG. 14). The filter weight learning unit 210 may expand the pupil coordinate data to a certain range from the pupil center. For example, a pixel value within the expanded range may be equal to the pixel value of the pupil center. Accordingly, a pixel within the expanded range in the pupil region may have the maximum pixel value (e.g., a pixel value of 255).

The filter weight learning unit 210 may perform Gaussian filtering on the expanded pupil coordinate data (operation S164 in FIG. 14) and may generate a target image TI on the basis of the output of the Gaussian filtering (operation S165 in FIG. 14). For example, the target image TI may have the maximum pixel value (e.g., a pixel value of 255) at the pupil center through the Gaussian filtering, and the pixel value may decrease in a direction away from the pupil center. The target image TI may include meaningful information related to the pupil (e.g., spatial information of the pupil) on the basis of the maximum pixel value and the distribution area of the expanded pupil coordinate data.

Figure 15:
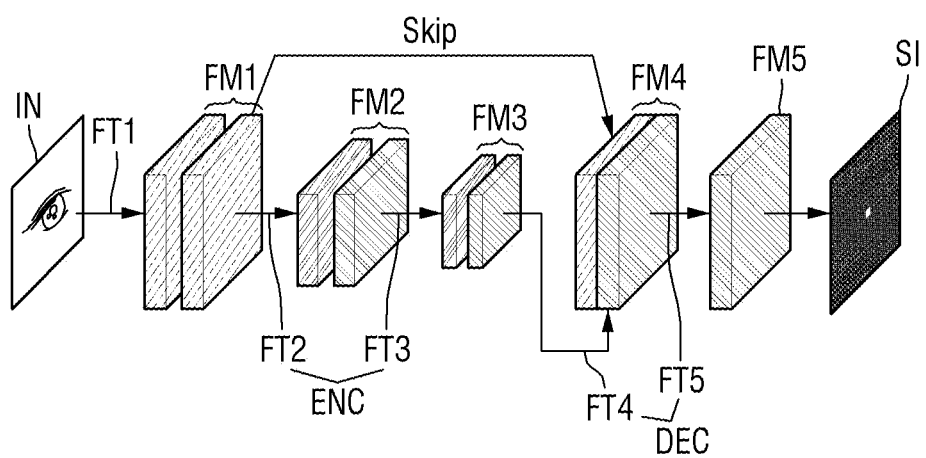
FIG. 15 is a diagram showing a process of generating a pupil region split image by a split image generation unit according to some example embodiments.
Figure 16:
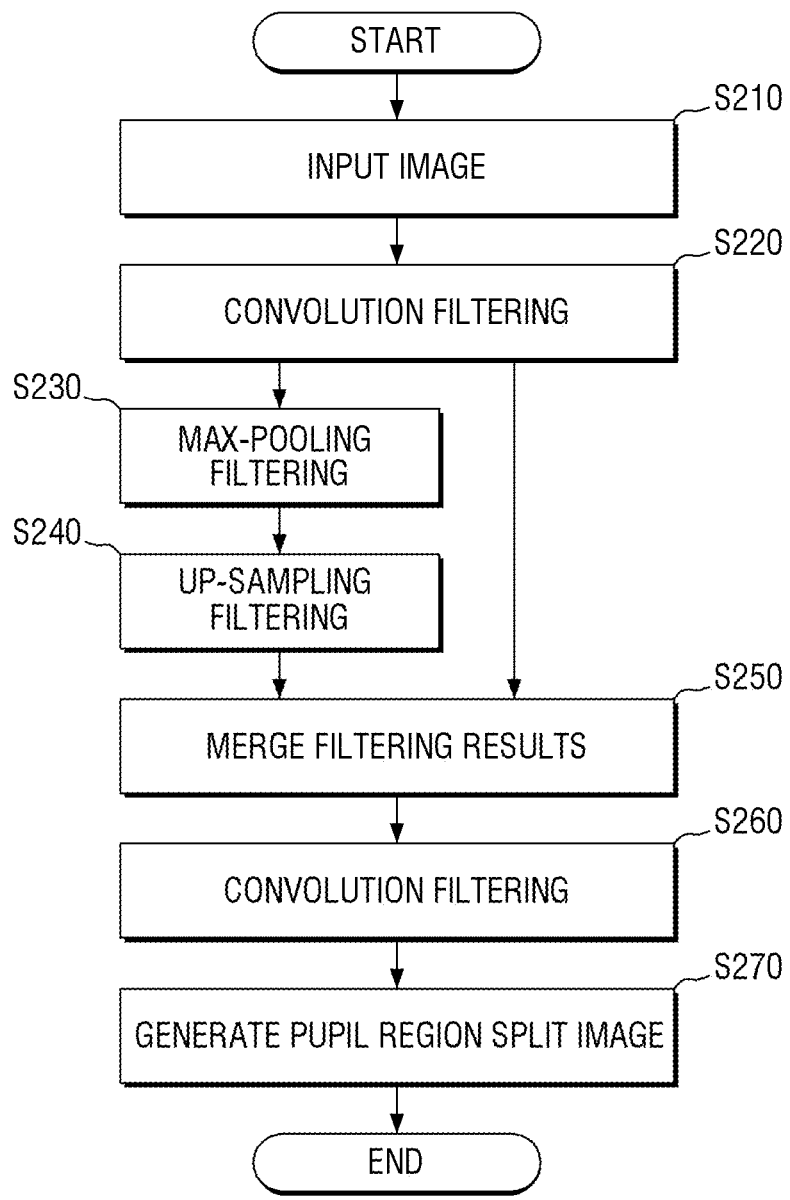
FIG. 16 is a flowchart illustrating the process of generating a pupil region split image by the split image generation unit according to some example embodiments.

FIG. 15 is a diagram showing a process of generating a pupil region split image by a split image generation unit according to some example embodiments, and FIG. 16 is a flowchart illustrating the process of generating a pupil region split image by the split image generation unit according to some example embodiments.

Referring to FIGS. 15 and 16, the split image generation unit 220 may generate a pupil region split image SI for an input image IN using the weights of the plurality of filters FT1 to FT5 learned by the filter weight learning unit 210.

The split image generation unit 220 may receive an input image IN captured through the image input unit 100 (operation S210 in FIG. 16).

The split image generation unit 220 may perform convolution filtering on the input image IN using the first filter FT1 (operation 220 in FIG. 16). For example, the first filter FT1 may output a first feature map FM1 obtained by multiplying each of a plurality of pixels of the input image IN by a weight and then adding the multiplication results. The first filter FT1 may perform a dot product between the filter weight and the image data by sliding the filter weight on the input image IN.

The split image generation unit 220 may perform max-pooling filtering on the first feature map FM1 using the encoder ENC (operation S230 in FIG. 16). The encoder ENC may include the second and third filters FT2 and FT3.

The split image generation unit 220 may perform max-pooling filtering on the first feature map FM1 using the second filter FT2. The second filter FT2 may extract a main pixel value from the first feature map FM1 and output a second feature map FM2 having a small size.

The split image generation unit 220 may perform max-pooling filtering on the second feature map FM2 using the third filter FT3. The third filter FT3 may extract a main pixel value from the second feature map FM2 and output a third feature map FM3 having a small size.

The split image generation unit 220 may perform up-sampling filtering on the third feature map FM3 using the fourth filter FT4 (operation S240 in FIG. 16). The fourth filter FT4 may increase the size of the third feature map FM3, which has been decreased by the encoder ENC, to a size corresponding to the input image IN. For example, the fourth filter FT4 may remember a position of a pixel value before passing through the encoder ENC and may reflect the position of the pixel value in a fourth feature map FM4.

The split image generation unit 220 may include a skip connecting network Skip for connecting the feature map input to the encoder ENC to the feature map obtained by performing up-sampling filtering on the output of the encoder ENC. The skip connecting network Skip may transfer data input to the encoder ENC to the output of the encoder ENC without modification. For example, max-pooling filtering may be performed on the first feature map FM1 by the encoder ENC, and then up-sampling filtering may be performed on the first feature map FM1 by the fourth filter FT4. Also, since the first feature map FM1 is transferred over the skip connecting network Skip, the filtering process by the encoder ENC may be omitted. Also, the first feature map FM1 may be merged with the output of the fourth filter FT4. The skip connecting network Skip may provide, to the decoder DEC, detailed information or incidental information which is included in the first feature map FM1, in addition to the meaningful information related to the pupil or the positional information of the pupil which is included in the feature map FM1.

The split image generation unit 220 may merge the filtering result of the fourth filter FT4 with the filtering result of the first filter FT1 (operation S250 in FIG. 16). The split image generation unit 220 may merge the first feature map FM1 transferred by the skip connecting network Skip with the feature map output by the fourth filter FT4 to generate the fourth feature map FM4. For example, the feature map output by the fourth filter FT4 may include main information of the input image IN, and the first feature map FM1 may include both of the main information and incidental information of the input image IN. Accordingly, by the split image generation unit 220 including the skip connecting network Skip, it is possible to prevent an error that may occur due to detailed information or incidental information that has been removed in the encoder ENC. Furthermore, by the split image generation unit 220 including the skip connecting network Skip, it is also possible to improve weight learning efficiency through appropriate adjustment of the weights of the first to fifth filters FT1 to FT5.

The split image generation unit 220 may perform convolution filtering on the fourth feature map FM4 using the fifth filter FT5 (operation S260 in FIG. 16). For example, the fifth filter FT5 may output a fifth feature map FM5 obtained by multiplying each of a plurality of pixels of the fourth feature map FM4 by a weight and then adding the multiplication results. The fifth filter FT5 may perform a dot product between the filter weight and the fourth feature map FM4 by sliding the filter weight on the fourth feature map FM4.

The split image generation unit 220 may generate a pupil region split image SI including pupil coordinate information on the basis of the fifth feature map FM5 (S270).

Figure 17:
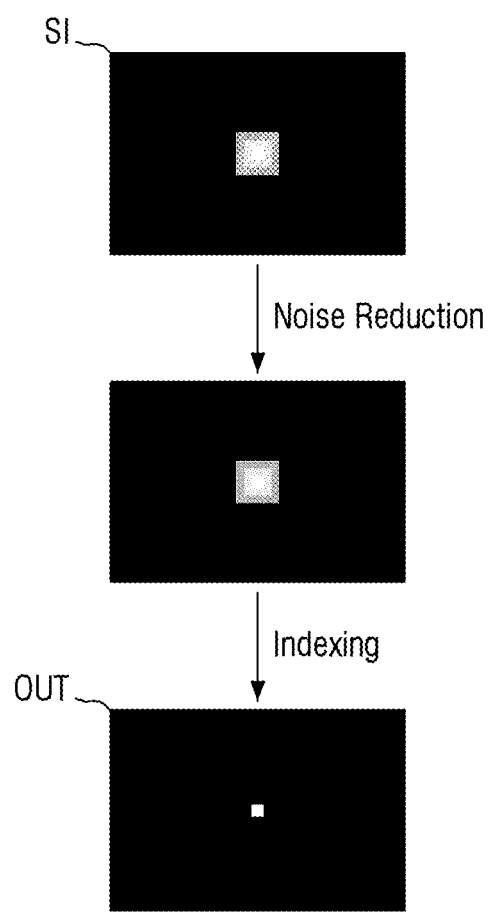
FIG. 17 is a view showing a process of detecting pupil coordinates by a pupil coordinate detection unit according to some example embodiments.
Figure 18:
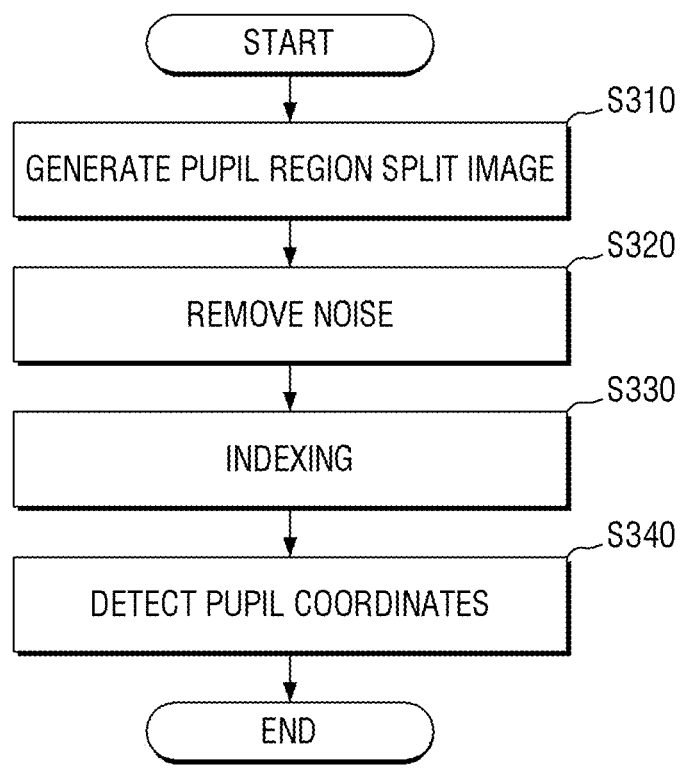
FIG. 18 is a flowchart illustrating the process of detecting pupil coordinates by the pupil coordinate detection unit according to some example embodiments.

FIG. 17 is a view showing a process of detecting pupil coordinates by a pupil coordinate detection unit according to some example embodiments, and FIG. 18 is a flowchart illustrating the process of detecting pupil coordinates by the pupil coordinate detection unit according to some example embodiments.

Referring to FIGS. 17 and 18, the pupil coordinate detection unit 230 may receive a pupil region split image SI and output pupil coordinates OUT.

The pupil coordinate detection unit 230 may receive the pupil region split image SI from the split image generation unit 220 (operation S310 in FIG. 18).

The pupil coordinate detection unit 230 may perform noise reduction on the pupil region split image (operation S320 in FIG. 18).

The pupil coordinate detection unit 230 may perform indexing on the pupil region split image from which noise has been removed (operation S330 in FIG. 18).

The pupil coordinate detection unit 230 may select at least one of a plurality of pixels from which noise has been removed and detect pupil coordinates (operation S340 in FIG. 18). Accordingly, the pupil coordinate detection unit 230 may detect the pupil coordinates OUT by indexing a pixel having the maximum pixel value in the pupil region split image from which noise has been removed.

With the pupil detection device according to some example embodiments, the filter weight learning unit may include an encoder for filtering a learning image and a decoder for filtering the output of the encoder to generate a filtered image. The filter weight learning unit may further include a skip connecting network for connecting a feature map input to the encoder to a feature map obtained by performing up-sampling filtering on the output of the encoder and an auxiliary filter for filtering the output of the encoder, the auxiliary filter having filters different from those of the decoder.

Therefore, the pupil detection device may accurately learn the weights of a plurality of filters, and thus it is possible to remove false detections for various input images, thereby improving detection performance.

The present invention is not limited to the above-described characteristics, and other various effects are included in this specification. The scope of embodiments according to the present disclosure is defined according to the appended claims and their equivalents.

What is claimed is:

1. A pupil detection device comprising:
a filter weight learner configured to generate a target image based on pupil coordinate data acquired from a learning image and learn weights of a plurality of filters in order to generate a filtered image, by filtering the learning image using the plurality of filters and merging a first feature map obtained by performing convolutional filtering on the learning image with a second feature map obtained by additionally performing max-pooling filtering and up-sampling filtering on the feature map obtained by performing convolution filtering, the filter weight learner is configured to perform convolution filtering on the merged feature map, such that the filtered image is within a predetermined reference range of the target image;
a split image generator configured to generate a pupil region split image for an input image using the plurality of filters having the learned weights; and
a pupil coordinate detector configured to remove noise of the pupil region split image, select at least one of a plurality of pixels from which noise is removed, and detect pupil coordinates.

2. The pupil detection device of claim 1, wherein the plurality of filters comprises:
a convolution filter configured to perform weighted convolution filtering and to generate a feature map;
a max-pooling filter configured to select a main value from an input feature map and perform max-pooling filtering; and an up-sampling filter configured to perform up-sampling filtering on the input feature map.

3. The pupil detection device of claim 2, wherein the plurality of filters comprise an encoder configured to perform the max-pooling filtering.

4. The pupil detection device of claim 2, wherein the plurality of filters comprise a decoder having at least one of the up-sampling filter, and at least one of the convolution filter.

5. The pupil detection device of claim 3, wherein the filter weight learner comprises a skip connecting network configured to connect a feature map input to the encoder to a feature map obtained by performing up-sampling filtering on an output of the encoder.

6. The pupil detection device of claim 3, wherein the plurality of filters further comprise an auxiliary filter having at least one of the max-pooling filter, and at least one of the up-sampling filter.

7. The pupil detection device of claim 1, wherein the filter weight learner is configured to change the weights of the plurality of filters and then to repeat a filtering process using the plurality of filters, in response to a number of weight learning times of the plurality of filters not reaching a predetermined number.

8. The pupil detection device of claim 7, wherein the filter weight learner is configured to change the weights of the plurality of filters based on a result of comparing the filtered image to the target image.

9. The pupil detection device of claim 1, wherein the filter weight learner is configured to change the weights of the plurality of filters and then to repeat a filtering process using the plurality of filters, in response to a result of comparing the filtered image to the target image not satisfying the predetermined reference.

10. A pupil detection device comprising:
a filter weight learner configured to generate a target image based on pupil coordinate data acquired from a learning image and learn weights of a plurality of filters in order to generate a filtered image, by filtering the learning image using the plurality of filters, that is within a predetermined reference range of the target image;
a split image generator configured to generate a pupil region split image for an input image using the plurality of filters having the learned weights; and
a pupil coordinate detector configured to remove noise of the pupil region split image, select at least one of a plurality of pixels from which noise is removed, and detect pupil coordinates,
wherein the filter weight learner is configured to:
sequentially perform convolution filtering and max-pooling filtering on the learning image;
perform up-sampling filtering and convolution filtering on the feature map on which max-pooling filtering has been performed to generate a main filtered image; and
perform max-pooling filtering, up-sampling filtering, and convolution filtering on the feature map on which max-pooling filtering has been performed to generate an auxiliary filtered image.

11. The pupil detection device of claim 10, wherein the filter weight learner is configured to change the weights of the plurality of filters and then repeat a filtering process using the plurality of filters in response to a number of weight learning times of the plurality of filters not reaching a predetermined number.

12. The pupil detection device of claim 11, wherein the filter weight learner is configured to change the weights of the plurality of filters based on a loss function calculated based on the target image, the main filtered image, the learning image, and the auxiliary filtered image.

13. The pupil detection device of claim 10, wherein the filter weight learner is configured to change the weights of the plurality of filters and then repeat a filtering process using the plurality of filters, in response to a loss function calculated based on the target image, the main filtered image, the learning image, and the auxiliary filtered image exceeding a predetermined value.

14. A pupil detection device comprising:
a filter weight learner configured to generate a target image based on pupil coordinate data acquired from a learning image and learn weights of a plurality of filters in order to generate a filtered image, by filtering the learning image using the plurality of filters, that is within a predetermined reference range of the target image;
a split image generator configured to generate a pupil region split image for an input image using the plurality of filters having the learned weights; and
a pupil coordinate detector configured to remove noise of the pupil region split image, select at least one of a plurality of pixels from which noise is removed, and detect pupil coordinates,
wherein the plurality of filters further comprise an auxiliary filter having at least one of the max-pooling filter, and at least one of the up-sampling filter,
wherein the filter weight learner is configured to:
merge a feature map obtained by performing convolution filtering on the learning image and then input to the encoder with a feature map obtained by performing up-sampling filtering on an output of the encoder, performs convolution filtering on the merged feature map to generate a main filtered image; and
perform filtering on the output of the encoder using the auxiliary filter to generate an auxiliary filtered image.

15. The pupil detection device of claim 14, wherein the filter weight learner is configured to change the weights of the plurality of filters and then repeat a filtering process using the plurality of filters in response to a number of weight learning times of the plurality of filters not reaching a predetermined number.

16. The pupil detection device of claim 15, wherein the filter weight learner is configured to change the weights of the plurality of filters based on a loss function calculated based on the target image, the main filtered image, the learning image, and the auxiliary filtered image.

17. The pupil detection device of claim 14, wherein the filter weight learner is configured to change the weights of the plurality of filters and then to repeat a filtering process using the plurality of filters, in response to a loss function calculated based on the target image, the main filtered image, the learning image, and the auxiliary filtered image exceeding a predetermined value.

18. The pupil detection device of claim 1, wherein the filter weight learner is configured to perform labeling on the learning image to acquire pupil coordinate data, expands the pupil coordinate data, and performs Gaussian filtering to generate the target image.

19. The pupil detection device of claim 1, wherein the pupil coordinate detector is configured to remove noise of the pupil region split image and to perform indexing on the pupil region split image from which the noise is removed to detect pupil coordinates.

\* \* \* \* \*